US012785447B2

(12) United States Patent
Samardzija et al.

(10) Patent No.: US 12,785,447 B2
(45) Date of Patent: Nov. 3, 2026

(54) WIRELESS CHARGING DIVERSITY SYSTEM FOR A SMART RING

(71) Applicant: Plume Design, Inc., Palo Alto, CA (US)

(72) Inventors: Miroslav Samardzija, Mountain View, CA (US); Hsiangyin Cheng, Taipei City (TW); Shu Chun Shen, Taipei City (TW); Liem Hieu Dinh Vo, San Jose, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 876 days.

(21) Appl. No.: 18/113,987

(22) Filed: Feb. 24, 2023

(65) Prior Publication Data

US 2024/0291319 A1 Aug. 29, 2024

(51) Int. Cl.
*H02J 50/10* (2016.01)
*H02J 7/70* (2026.01)

(52) U.S. Cl.
CPC ................ *H02J 50/10* (2016.02); *H02J 7/70* (2026.01)

(58) Field of Classification Search
CPC .......... H02J 50/10; H02J 7/0042; H02J 50/12; H02J 50/90
USPC .......................................................... 320/108
See application file for complete search history.

(56) References Cited

U.S. PATENT DOCUMENTS 6,853,197 B1 2/2005 McFarland et al.
6,961,545 B2 11/2005 Tehrani et al.
7,245,882 B1 7/2007 McFarland
7,245,893 B1 7/2007 Husted et al.
7,251,459 B2 7/2007 McFarland et al.
8,688,043 B2 * 4/2014 Lewin ...................... H04B 5/48 455/41.1
8,818,297 B2 * 8/2014 Merlin ............. G06K 19/07749 455/73

(Continued)

FOREIGN PATENT DOCUMENTS

CN 107706548 A * 2/2018 ............. H01Q 23/00
CN 112054313 A 12/2020
EP 4224668 A1 * 8/2023 .............. H02J 50/12

OTHER PUBLICATIONS

Nov. 22, 2022, International Search Report and Written Opinion for International Application No. PCT/US2022/038862.

(Continued)

*Primary Examiner* — M Baye Diao
(74) *Attorney, Agent, or Firm* — Nicholas Martin; Greenberg Traurig, LLP

(57) ABSTRACT

Disclosed is a charger for a smart ring that includes a charger island disposed to the charger and configured to receive the smart ring. The charger island has a plurality of transmit antennas located in or on the charger island. When activated, a transmit antenna is configured to couple, via a Near Field Communication (NFC) chip/circuit, with a receive antenna on the smart ring for charging thereof. The active transmit antenna is based on an orientation of the smart ring on the charger island where the charging is performed regardless of alignment between the ring and the charger island. A conductive sheet can be included between the plurality of transmit antennas and an interior of the charger island in order to isolate the plurality of transmit antennas from one another.

15 Claims, 16 Drawing Sheets

(56) References Cited

U.S. PATENT DOCUMENTS

| | | | |
|---|---|---|---|
| 9,136,937 B1 | 9/2015 | Cheng et al. | |
| 9,160,584 B1 | 10/2015 | Kavousian et al. | |
| 10,855,335 B1 | 12/2020 | Napoles et al. | |
| 11,026,177 B1 | 6/2021 | Chung | |
| 11,328,283 B2 * | 5/2022 | Rezayee | G06K 19/0709 |
| 11,419,546 B2 | 8/2022 | Cihan et al. | |
| 11,850,069 B1 * | 12/2023 | Mars | A61B 5/02438 |
| 11,984,742 B2 * | 5/2024 | Sanchez | H02J 7/40 |
| 12,142,939 B2 * | 11/2024 | Johnston | H02J 50/20 |
| 2013/0090057 A1 | 4/2013 | Green et al. | |
| 2013/0293424 A1 | 11/2013 | Zhu et al. | |
| 2014/0009344 A1 | 1/2014 | Zhu et al. | |
| 2014/0009355 A1 | 1/2014 | Samardzija et al. | |
| 2014/0112511 A1 | 4/2014 | Corbin et al. | |
| 2014/0226572 A1 | 8/2014 | Thota et al. | |
| 2014/0340265 A1 | 11/2014 | Vazquez et al. | |
| 2015/0099474 A1 | 4/2015 | Yarga et al. | |
| 2015/0109167 A1 | 4/2015 | Yarga et al. | |
| 2015/0195836 A1 | 7/2015 | Malkin et al. | |
| 2015/0302976 A1 | 10/2015 | Chang et al. | |
| 2015/0303568 A1 | 10/2015 | Yarga et al. | |
| 2015/0311960 A1 | 10/2015 | Samardzija et al. | |
| 2016/0056526 A1 | 2/2016 | Li et al. | |
| 2016/0135684 A1 | 5/2016 | Kappel et al. | |
| 2016/0336643 A1 | 11/2016 | Pascolini et al. | |
| 2017/0250563 A1 * | 8/2017 | Davison | H02J 50/10 |
| 2019/0036199 A1 * | 1/2019 | Mazooji | G06K 19/07783 |
| 2020/0077954 A1 | 3/2020 | Bossetti et al. | |
| 2020/0077955 A1 | 3/2020 | Shui et al. | |
| 2020/0233452 A1 | 7/2020 | von Badinski et al. | |
| 2020/0388914 A1 * | 12/2020 | Ke | H01Q 21/0018 |
| 2021/0226668 A1 * | 7/2021 | Cordier | H01Q 3/24 |
| 2021/0274273 A1 | 9/2021 | Chawan et al. | |
| 2022/0019993 A1 | 1/2022 | Rezayee et al. | |
| 2023/0037029 A1 * | 2/2023 | Samardzija | H01Q 1/085 |

OTHER PUBLICATIONS

International Search Report and Written Opinion to corresponding Int'l Appln. No. PCT/US24/015905 mailed Aug. 2, 2024 (11 pages).

* cited by examiner

| Control Bits | | | | | |
|---|---|---|---|---|---|
| Tx1 | | Tx2 | | Tx3 | |
| S_i | S_r | S_i | S_r | S_i | S_r |
| 1 | 1 | 0 | 0 | 0 | 0 |

| Control Bits | | | | | |
|---|---|---|---|---|---|
| Tx1 | | Tx2 | | Tx3 | |
| S_i | S_r | S_i | S_r | S_i | S_r |
| 0 | 0 | 1 | 1 | 0 | 0 |

| Control Bits | | | | | |
|---|---|---|---|---|---|
| Tx1 | | Tx2 | | Tx3 | |
| S_i | S_r | S_i | S_r | S_i | S_r |
| 0 | 0 | 0 | 0 | ON | ON |

| Control Bits | | | | | |
|---|---|---|---|---|---|
| Tx1 | | Tx2 | | Tx3 | |
| S_i | S_r | S_i | S_r | S_i | S_r |
| 0 | 0 | 0 | 0 | 0 | 0 |

WIRELESS CHARGING DIVERSITY SYSTEM FOR A SMART RING

FIELD OF THE DISCLOSURE

The present disclosure relates generally to wireless charging. More particularly, the present disclosure relates to a wireless charger and charger island disposed to the charger and configured to receive a smart ring.

BACKGROUND OF THE DISCLOSURE

With the miniaturization of electronic devices over the years, various types of relatively small, wearable devices have been introduced.

BRIEF SUMMARY OF THE DISCLOSURE

Accordingly, such devices (e.g., smart rings, watches, wrist bands, earbuds, headphones, emergency alert devices, health monitoring devices, and the like) typically require an external charging device or case. As such, there currently is a need to provide advanced functionality, aesthetic design, and compact form-factor for such charging cases.

For the compact form-factor, there is a need in the charging case to support a multi-function antenna, such as a Near-Field Communication (NFC) charger configured to create a magnetic field for charging the wearable device battery, and a Bluetooth antenna for pairing and communication. The NFC charger consists of an NFC chip which provides the control functions and feeds current to the transmit antenna, wherein the transmit antenna wirelessly charges the wearable device battery via mutual coupling between the transmit antenna and receiving antenna. The NFC chip is connected to the transmit antenna by antenna feed lines which can be included as part of a flex PCB or similar. The transmit antenna (Tx) on the charger mutually couple with the receive antenna (Rx) on the wearable device and provide power wirelessly to charge the battery in the smart device. In addition to NFC charging technology, Qi, or other near-field coupling technologies are also used. Traditionally wireless charging has been implemented via Qi (RIP PMA) using a power source from the wall and energizing Qi coils emitting inductive charging between the charger and the device.

Wireless charging using NFC technology includes slower charging speeds when compared to Qi charging, however, enables smaller devices to wirelessly charge as charging with Qi coils requires physically large coils. The wireless charger also needs to be portable and typically includes a battery as part of the charger so that the user can unplug from the power source and charge the wearable device remotely without access to a power source.

Typical smart ring charging can be achieved where the ring is placed on a charger and the charger transmits power wirelessly from its NFC transmitting (Tx) antenna (typically hidden on the charger island) while the smart ring receives the power via its NFC receiving (Rx) antenna (typically on the side of the ring). Wireless charging techniques utilize magnetic field coupling between the two antennas where the orientation of the two antennas to one another affects the power transfer efficiency between the two devices. The Tx antenna on the charger island and the Rx antenna on the smart ring need to be aligned for efficient power transfer from the charger to the smart ring. A proper alignment where the magnetic field is directed from the Tx antenna to the Rx antenna optimizes the magnetic field coupling between the two antennas and provides maximum power transfer. To align the smart ring Rx antenna and the charger Tx antenna correctly to achieve maximum power transfer for optimized charging there exists a mechanical feature such as a protrusion and/or indentation in the ring and the charger.

Despite these mechanical features that exist on the ring and the charger to assist with proper charging alignment, there still exists opportunities for the user to misalign the ring, orient the ring in the wrong direction, or wear the mechanical alignment features on the ring down to the point where the mechanical alignment features are rendered ineffective. The result of misalignment of the smart ring antenna to the charger antenna can result in inefficient power transfer or no power transfer.

As such, there currently exists a need for an improved smart ring charging solution that does not rely on the ring being aligned a specific way, among other existing shortcomings. A wireless charging station that consists of features that allow misalignment of the smart ring would provide a great benefit to the user as it would be an added convenience where also increasing efficiency of the smart ring charging.

Accordingly, the present disclosure addresses such shortcomings in the art and provides novel functionality related to portable electronic charging, which can include a case with a compact form-factor, such as for a smart ring or the like. According to some embodiments, as discussed herein, disclosed is an electronic charging case that can include a charger and a charger island that is disposed to the charger. In some embodiments, the charger island can have a substantially circular shape (e.g., having a shape associated with a circle or being round, in a manner that correlates to deviations from a standard circle while maintaining the recognizable shape of a circle, for example) and can be configured to receive the smart ring. In some embodiments, a plurality of transmit antennas can be located in and/or on the charger island where an active transmit antenna of the plurality of transmit antennas is configured to couple with a single receive antenna on the smart ring for charging. In some embodiments, an active transmit antenna is based on an orientation of the smart ring on the charger island such that the charging is performed regardless of alignment between the ring and the charger island.

In some embodiments, the charger island can further include a conductive sheet located between the plurality of transmit antennas and an interior of the charger island so as to isolate the plurality of transmit antennas from one another. In some embodiments, the charger also including a ferrite sheet having antenna pattern lines thereon for the plurality of transmit antennas. In some embodiments, the charger includes a NFC circuit including an NFC chip that feeds current to couple to the plurality of transmit antennas and configured to detect which of the plurality of antennas should be the active transmit antennas. In some embodiments, the charger also can include an NFC circuit coupled to the plurality of transmit antennas via one or more switches where the active transmit antenna can be based on settings of the one or more switches.

In some embodiments, the charger can include and/or have associated therewith the one or more switches that are dual pole X throw (DPXT) switches, where X is a number of the antennas and where the one or more switches are a plurality of single pole double throw (SPDT) switches. In some embodiments, each switch can be configured to switch between coupling lines of the plurality of antennas. In some embodiments, the charger can include a ferrite sheet having antenna pattern lines thereon for the plurality of transmit antennas, where the one or more switches are a plurality of single pole double throw (SPDT) switches configured to switch between corresponding antenna pattern lines. In some embodiments, the one or more single pole double throw (SPDT) switches can be located on a flexible printed circuit (FPC) and connected to the transmit antennas through a via in the ferrite sheet.

BRIEF DESCRIPTION OF THE DRAWINGS

The present disclosure is illustrated and described herein with reference to the accompanied drawings, in which like reference numbers are used to denote like system components/method steps, as appropriate, and in which.

DETAILED DESCRIPTION OF THE DISCLOSURE

According to some embodiments, the present disclosure provides a novel charger for a smart ring with a charger island disposed to the charger. In some embodiments, as discussed herein, the charger island can have a substantially circular shape and can be configured to receive the smart ring. In some embodiments, the charger island includes a plurality of transmit antennas located in or on the charger island, where an active transmit antenna is configured to couple with a receive antenna on the smart ring for the purpose of charging. In some embodiments, the active transmit antenna is based on an orientation of the smart ring on the charger island, such that the charging is performed regardless of alignment between the ring and the charger island. In some embodiments, a conductive sheet between the transmit antennas can be included on the interior of the charger island, which can enable the isolation of the transmit antennas from each other. In some embodiments, the charger includes a NFC circuit coupled to the transmit antennas and configured to detect which of the transmit antennas should be the active transmit antenna. In some embodiments, the NFC circuit is coupled to the transmit antennas via one or more switches based on settings of the one or more switches.

In some embodiments described herein, the charger and charging island is described for charging a smart ring. Those skilled in the art will appreciate the charger and charging island can be adapted for any compact user-wearable devices, such as, without limitation, rings, earbuds, heart monitors, emergency alert systems, smart watches, smart bracelets, and the like.

Figure 1C:
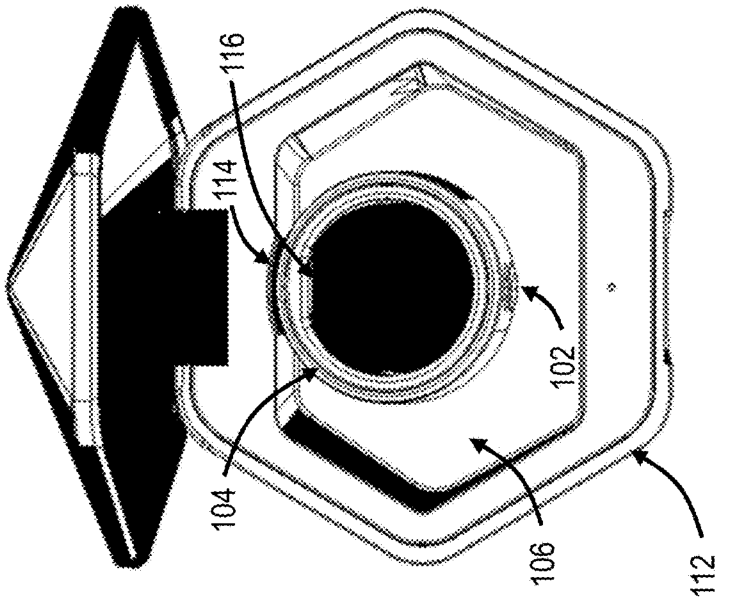
FIGS. 1A-1C are diagrams illustrating detectable actions of placing the smart ring on a charger island post according to some embodiments of the present disclosure.
Figure 1B:
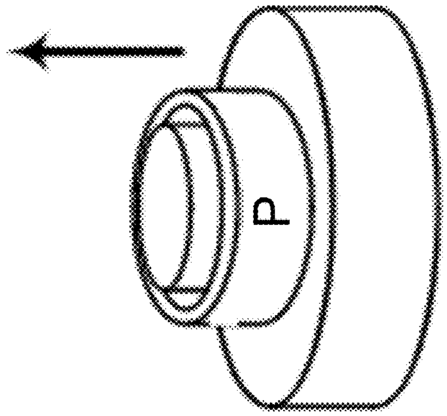
Figure 1A:
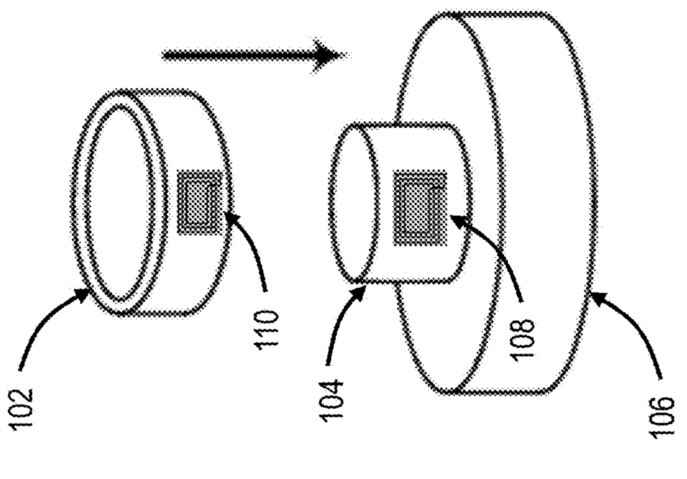

Turning to FIGS. 1A-1C, depicted are non-limiting example embodiments of configurations of a smart ring charger. FIGS. 1A-1C illustrate detectable actions of placing the smart ring 102 on a charger island post 104 of a NFC charger. In some embodiments, the necessary alignment of the smart ring 102 in relation to the charger island post 104 of the NFC charger 106 is described herein. In this approach, it is expected that the user may move the smart ring 102 on and off the charger island post 104 repeatedly within a short amount of time. The smart ring is wirelessly charged using NFC, Qi, or any other known or to be known near field coupling or pairing technologies. In some embodiments, a charging scenario includes placing the ring on the charging island where the NFC charger 106 transmits power wirelessly from its Tx antenna 108 hidden on the charger island post 104 while the ring receives the wireless power via its NFC Rx antenna 110 installed inside the smart ring 102. In some embodiments, the NFC charger 106 can be part of a charging case 112 which includes a base; a front cover connected to the base and configured to seal an interior of the charging case; a charger island post 104 on the base and in the interior, wherein the base is dimensioned to receive a wearable device; an antenna disposed within the Tx antenna 108; and circuitry connected to the antenna and to a charging port located on the base.

In conventional configuration, the Rx antenna 110 and the Tx antenna 108 need to be aligned for efficient power transfer from charger to ring. This is due to the wireless power transfer using the available technologies such as NFC and the limitation of the electromagnetic field and strength of the field. In a non-limiting example, the proper alignment is shown in FIG. 1B where the ring is oriented with reference "P" which is the orientation that provides the most efficient power transfer between the Rx antenna 110 and the Tx antenna 108. According to some embodiments, since the smart ring 102 and the NFC charger 106 are designed for compact use, the antennas are strategically positioned on each device and only have a limited amount of space allocated on each device. Further, the Rx and Tx antennas need to be very similar to one another in order to optimize power transfer, therefore a large Tx antenna on the charger island post 104 and a smaller Rx antenna on the smart ring 102 would not accommodate the optimal coupling power transfer using the wireless charging methods available.

In some embodiments, the overall charging case 112 which houses the charger island post 104 and the NFC charger 106 is shown in FIG. 1C and can protect the charging components as well as enable the charging components to be portable. The charging case 112 can further include an embedded battery in the base, connected to the circuitry and the charging port. The charging case 112 can further include a light pipe on the base and connected to a light emitting diode (LED) on the circuitry. In some embodiments, the charging case 112 can further include a light sensor in the circuitry, wherein the light sensor is configured to monitor light in a room where the charging case is located. The circuitry can be configured to illuminate the LED based on light in a room where the charging case is located. In some embodiments, the charging case 112 can further include an ambient temperature sensor in the circuitry. In some embodiments, the circuitry can be configured to monitor ambient temperature in a room where the charging case is located and utilize the monitored ambient temperature for one of a plurality of functions. In some embodiments, the plurality of functions can include monitoring for falls with the wearable device, monitoring sleep of a user wearing the wearable device, and monitoring body temperature of the user.

In some embodiments, in order to ensure the Rx antenna 110 on the smart ring aligns with the Tx antenna 108 on the charger island, mechanical features such as, but not limited to, an indention 114 or protrusion on the charging island post 104 and indention 116 or protrusion on the smart ring 102 can be introduced. In some embodiments, the mechanical means of alignment may be needed to ensure the user aligns the ring in the charging case 112 where the power transfer between the Tx antenna 108 and the Rx antenna 110 is operating at the greatest efficiency. Under conventional techniques and configurations, the need to have the ring aligned in a specific orientation is a further burden for the user and also may not prevent the user from forcing the ring on the charging island post 104 in a misaligned direction. The protrusion or indention 116 on the smart ring 102 can create user comfort issues as the design of the protrusion or indention 116 compromises the circular shape of the ring 102. In addition to user comfort issues that result from the mechanical feature the indention can affect the aesthetic design of the ring which is particularly important with smart rings.

Figure 2E:
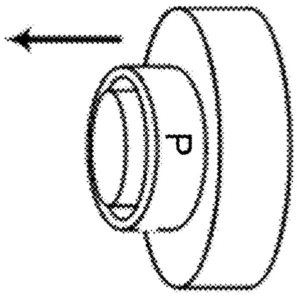
FIGS. 2A-2E are diagrams illustrating actions of placing the smart ring on a charger island post of a smart ring charger according to some embodiments of the present disclosure.
Figure 2D:
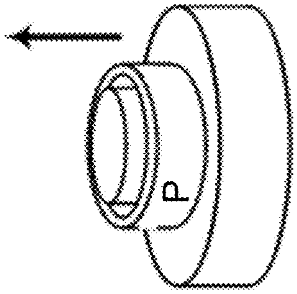
Figure 2C:
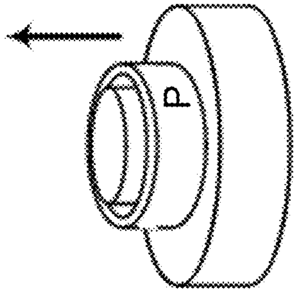
Figure 2B:
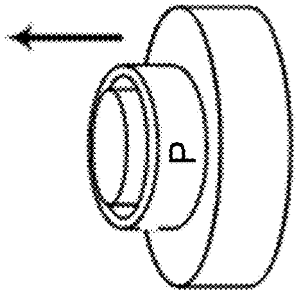
Figure 2A:
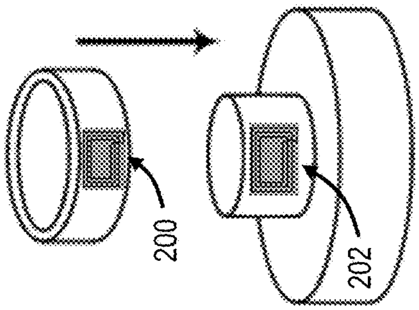

According to some embodiments, FIGS. 2A-2E illustrate example actions of placing the smart ring on a charger island post of a smart ring charger. As discussed herein, under conventional configurations, such actions depicted in FIGS. 2A-2E can cause misalignment and prevent the ring from being charged or reduce charging efficiency. In some embodiments, FIG. 2A illustrates a smart ring with Rx antenna 200 and the proper alignment needed with the Tx Antenna of the charging island 202 to allow wireless charging to occur. As further illustrated in FIG. 2B with "P" representing the proper alignment, the ring can receive the most efficient power transfer from the charger utilizing NFC, Qi, or any other near field coupling and/or pairing technologies. If the ring is misaligned where it is turned counterclockwise as illustrated in FIG. 2C or clockwise as illustrated in FIG. 2D the ring would either receive a less effective charge or possibly no charge at all.

Accordingly, despite the mechanical features that exist on the ring 102 and the charger island post 104 as described in FIG. 1C, there do exist opportunities for misalignment. Considering the charger island post 104 and the smart ring 102 can be comprised of soft plastic materials the misalignment can be caused by the user forcing the ring onto the charger island post or the mechanical alignment protrusion can also be worn off by wear and tear caused from long use. Misalignment can also occur as the ring gets looser fitting from long use as it could cause the ring to not fit into the alignment method on the charging post. In some embodiments, FIG. 2E illustrates a scenario where the ring is flipped which can also result in an inefficient or no power transfer from the charging island Tx antenna 202 to the smart ring Rx antenna 200.

Figure 3A:
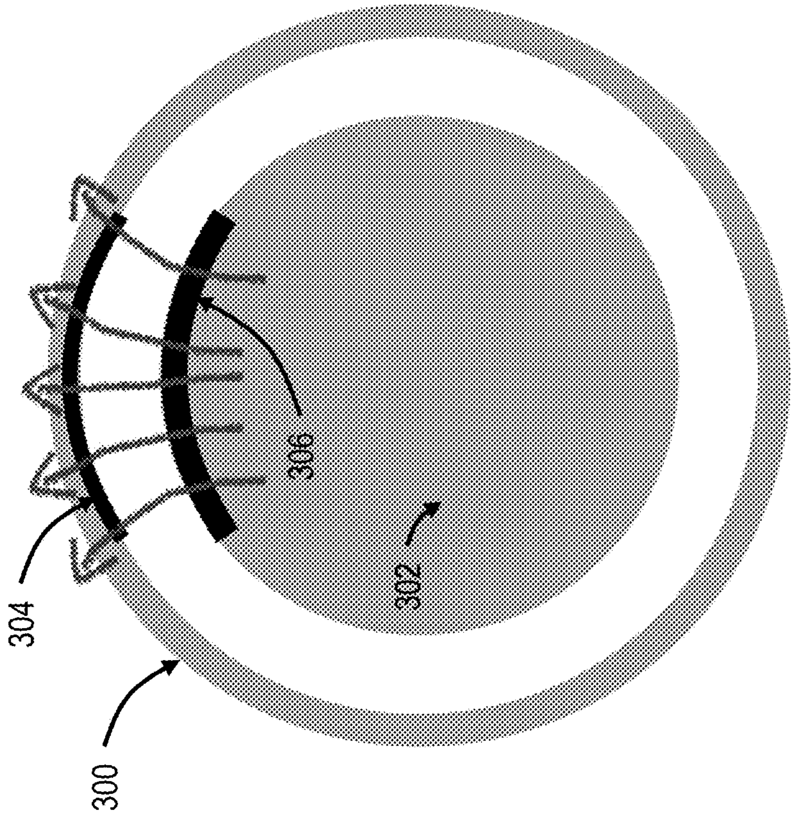
FIG. 3A-3B are diagrams illustrating the alignment of the ring and the charger required for efficient power transfer according to some embodiments of the present disclosure.
Figure 3B:
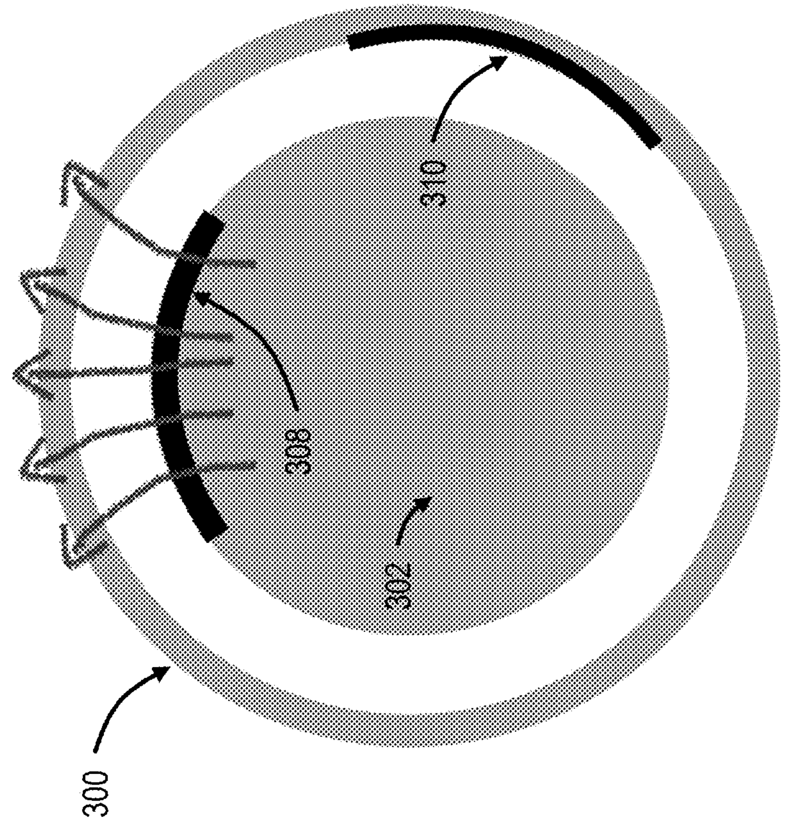

According to some embodiments, FIG. 3A-3B depict top view diagrams illustrating the alignment of the ring 300 and the charger 302 required for and/or that enables efficient power transfer. It should be noted that FIG. 3A is an illustration to describe the power transfer that occurs when the smart ring Rx antenna 304 is aligned with the charger Tx antenna 306, and those skilled in the art will recognize the illustration shown does not include other features of the charging case and does not represent the actual dimensions and spacing of the smart ring 300 to the charger 302.

In some embodiments, the smart ring Rx antenna 304 aligned with the charger island post Tx antenna 306 allows power transfer from the charger island post antenna 306 to the smart ring antenna 304 as represented by arrow lines illustrating the magnetic field coupling. In some embodiments, such alignment shown in FIG. 3A results in the best wireless power transfer available. The NFC chip feeds current through the charging island Tx antenna 306 creating a magnetic field, which is coupled to the smart ring Rx antenna 304 wherein a current is induced in the smart ring Rx antenna 304. The induced current in the smart ring Rx antenna 304 is used to charge the smart ring battery. In some embodiments, FIG. 3B represents the same magnetic field created by the current flow through the charging island Tx antenna 308. In this illustration the smart ring Rx antenna 310 is rotated clockwise and in misalignment with the charging island Tx antenna 308 magnetic field represented by arrow lines. In some embodiments, the magnetic field from the charging island Tx antenna 308 is directed in the same direction as FIG. 3A but the induced current does not reach the smart ring Rx antenna 310. Based on the misalignment of the smart ring, the power transfer efficiency can be greatly reduced or can be entirely lost where no power transfer occurs and the smart ring battery does not get charged. As such, as discussed herein, according to the disclosed systems and methods, disclosed is a novel technical solution to such existing technical problems, among others, where a smart ring Rx antenna can be oriented in any degree around the charging island, which would eliminate the problem of charging ring misalignment.

Figure 4:
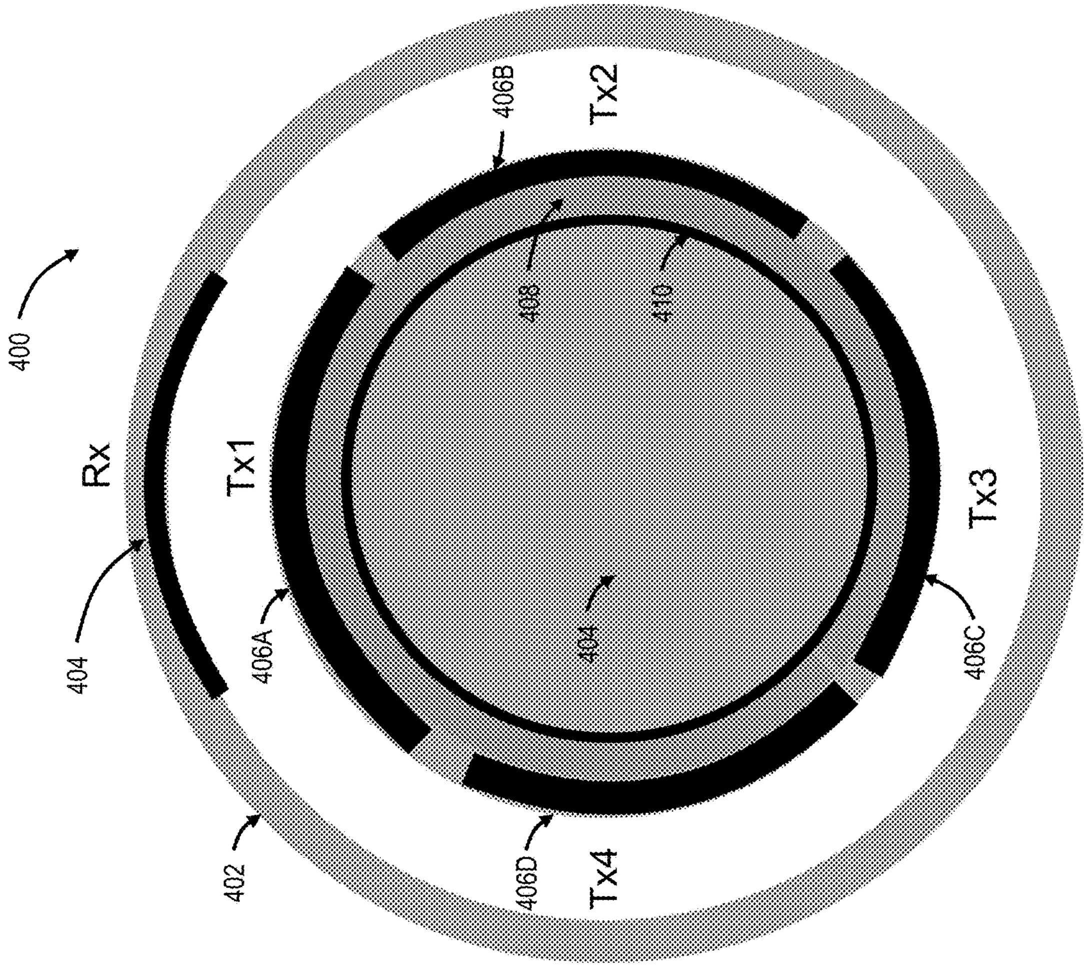
FIG. 4 is a diagram illustrating the antenna diversity according to some embodiments of the present disclosure.

In FIG. 4, depicted is a configuration of antenna diversity. In some embodiments, diagram 400 illustrates a similar smart ring 402 and charger island 404 as was illustrated in FIGS. 3A-3B. The charger island shown 404 includes multiple transmit Tx antennas around the periphery (406A-

406D) which when combined cover the entire perimeter of the charger island 404. In some embodiments, the number of Tx antennas associated with the charger island depends on the size of the smart ring Rx antenna, hence, if the smart ring Rx antenna was smaller than what is shown there could be more charger island Tx antennas (406A-406D). Introducing multiple Tx antennas (406A-406D) as shown in 400 can introduce interference as the mutual coupling can occur with the other antennas associated with the charger and charger island 404. In some embodiments, in order to prevent unwanted magnetic coupling between the Tx antennas, a ferrite sheet 408 which acts as a magnetic field insulator can be placed behind the Tx antennas around the periphery of the charger island. In some embodiments, a ferrite sheet is used to suppress electromagnetic emissions/noise by blocking low frequency noise and absorbing high frequency noise. According to some embodiments, while the disclosure herein is discussed with the usage of a sheet of ferrite material, it should not be construed as limiting, as one of ordinary skill in the art would readily understand that the inclusion of a sheet, material and/or layer of any material and/or variation of ferrite, whether known or to be known, with similar characteristics can be substituted therein without departing from the scope of the instant disclosure.

In some embodiments, in addition to the ferrite sheet 408 a layer of conductive sheet flexible printed circuit (FPC) 410 is placed on the charger island. The ferrite sheet 408 is placed between the Tx antennas (406A-406D) and the conductive sheet FPC 410 wherein, the conductive sheet has no impact on the coupling between Tx antennas (406A-406D) and Rx antenna 404. The coupling lines are used to connect the NFC chip to the Tx antenna patterns where the NFC chip feeds current to the appropriate Tx antenna. The layer of conductive sheet FPC 410 is placed behind the ferrite sheet 408 and allows for the charger island 404 to be filled with electronics. The ferrite sheet 408 prevents the Tx antennas (406A-406D) from coupling with one another and with the electronics associated with the conductive sheet FPC 410. As illustrated in FIGS. 3A-3B the magnetic field direction is out to the periphery of the charger island 404 and smart ring 402, therefore the arrangement of the Tx antennas (406A-406D) around the periphery of the charging island 404 results in very minimal leakage or undesirable coupling from one Tx antenna to the other. The ferrite sheet and conductive layer which are added behind the Tx antennas isolate those antennas from one another and from other antennas and electronics associated with the charger island. The challenge with the Tx antenna configuration shown 400 is managing a single NFC chip feed and controlling and activating a single Tx antenna from the plurality of Tx antennas.

Figure 5B:
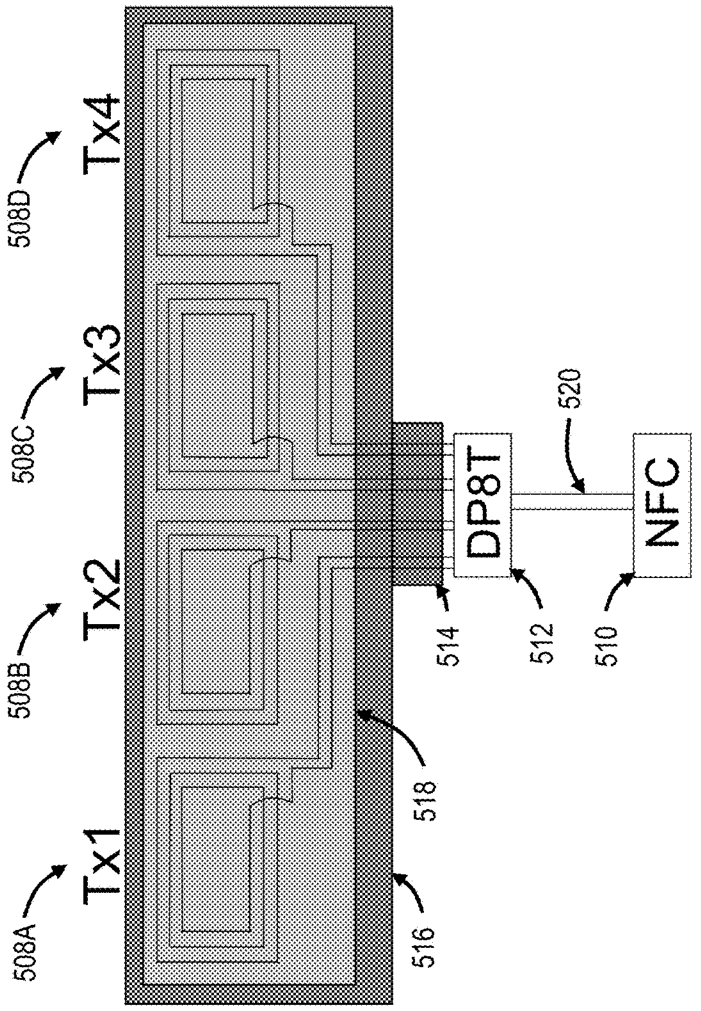
FIGS. 5A-5B illustrate a circuit schematic and top view depicting the NFC smart ring charger parallel feeding solution for multiple Tx antennas according to some embodiments of the present disclosure.
Figure 5A:
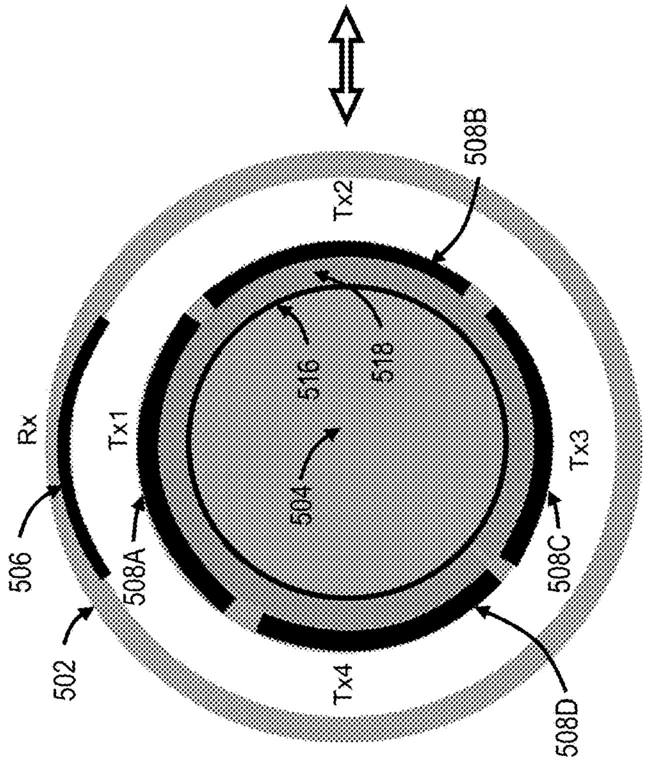

FIGS. 5A-5B illustrate non-limiting example embodiments of a circuit schematic and top view depicting the NFC smart ring charger parallel feeding solution for the multiple Tx antennas. In some embodiments, FIG. 5A illustrates the top view of the smart ring 502 with Rx antenna 506 and the charger island 504 with multiple Tx antennas (508A-508D) represented by Tx1, Tx2, Tx3, and Tx4. The schematic diagram for the multiple Tx antennas is shown in FIG. 5B where the same Tx1, Tx2, Tx3, and Tx4 antennas are shown as compared to FIG. 5A. The ferrite sheet is shown represented on the top view and the electrical schematic 518 and the conductive sheet is also shown 516. Considering there is only one NFC chip located on an RF printed circuit board (PCB) 510 inside the charger a switching means is required to select the correct Tx antenna circuit (Tx1, Tx2, Tx3, and Tx4 represented by 508A-508D). The NFC chip feeds the antenna wherein current is fed into the antenna loop and back out as represented by the two lines that make up the antenna circuits 520. The NFC chip detects which Tx antenna has the strongest magnetic coupling between the smart ring Rx antenna 506 and the Tx antennas (508A-508D) based on the orientation of the smart ring on the charging island. By implementing a dual pole eight throw (DP8T) switch 512 between the four Tx antennas (508A-508D) and the NFC chip 510, selection of a single Tx antenna can be accomplished with only a single NFC RF chip 510 feeding the antenna patterns. In some embodiments, the Tx antennas would be connected to the DP8T switch in a parallel configuration as shown in FIG. 5B. Multiple NFC RF chips could be used instead of the DP8T switch; however, a single NFC RF chip reduces space inside the charger as well as reducing power consumption and heat buildup in the charger. This DP8T switch 512 can be installed on the flex tail portion of the antenna circuit 514 or can be installed on the RF PCB associated with the charger island. This solution of the single NFC RF feed 510 and the dual pole eight throw (DP8T) switch 512 would allow the charger to select the Tx antenna that is the most appropriate based on the orientation of the smart ring Rx antenna 506. The NFC chip will sense and recognize the greatest load on the Tx antenna on the charger island which is best aligned with the smart ring Rx antenna and the NFC chip will activate that Tx antenna via the DP8T switch. The tradeoff to this solution for selecting the correct antenna circuit based on the orientation of the smart ring is the DP8T switch is costly and takes up additional space in the charger. If the DP8T switch 512 was mounted on the flex tail 514, the need for wider flex tails and extra space for feeding lines would be necessary. If the DP8T switch 512 was mounted on the RF PCB additional space on the PCB would be taken up and the wider flex tails for all four Tx antennas would still be required to accommodate the multiple coupling lines between the DP8T and the Tx antennas.

Figure 6B:
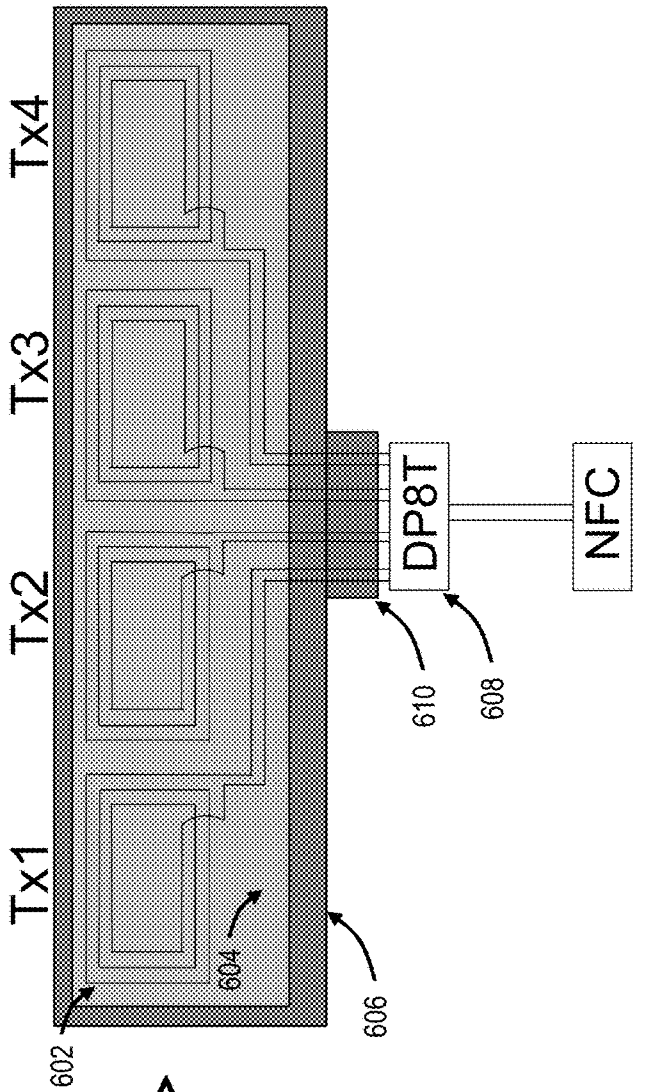
FIGS. 6A-6B illustrate a circuit schematic and a cross section of the multiple Tx antennas configured in parallel associated with the smart ring charger according to some embodiments of the present disclosure.
Figure 6A:
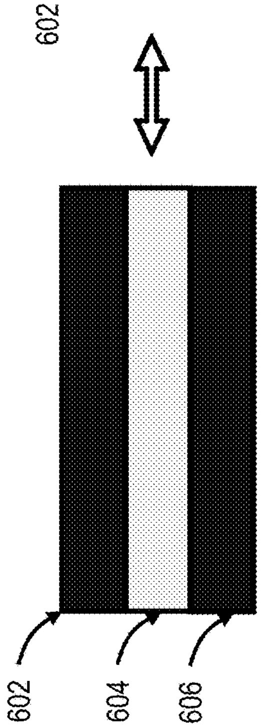

FIGS. 6A-6B illustrate non-limiting example embodiments of a circuit schematic and a cross section of the multiple Tx antennas configured in parallel associated with the smart ring charger. In some embodiments, FIG. 6A depicts the layers that comprise the parallel Tx antenna configuration wherein the top layer is the FPC 602 which supports the Tx antenna pattern including Tx1, Tx2, Tx3, and Tx4 and associated antenna leads. Located below the top layer is the ferrite sheet 604 which is typically 30~200 micrometers and also prevents the Tx antenna patterns 602 from inducing currents on the bottom FPC 606 that in turn would cancel the magnetic fields from the top antenna FPC 602. The bottom FPC 606 provides shielding from the Tx antennas coupling to one another and creates a semi faraday cage for component placement on the FPC. The FPCs shown can be a single layer or multilayer based on the need for dielectric between conductive layers to provide isolation that is needed. The DP8T 608 can be located on the top FPC 602 or the bottom FPC 606 or on the flex tail 610. The DP8T is necessary in this antenna configuration as we have four Tx antennas, however as the design allows more or less Tx antennas to accommodate the size of the Rx antenna on the smart ring this switch can be represented as DPXT where X represents the number of number of throws required.

Figure 7B:
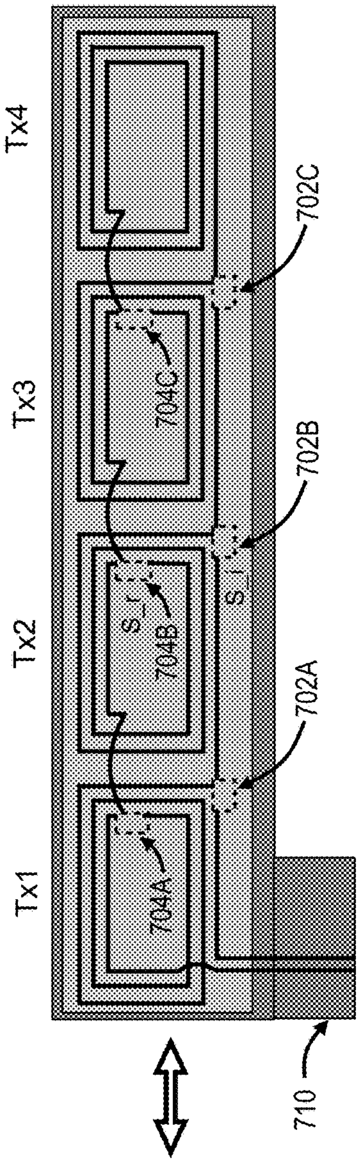
FIGS. 7A-7B illustrate a circuit schematic and a top view depicting a series feeding solution for multiple Tx antennas according to some embodiments of the present disclosure.
Figure 7A:
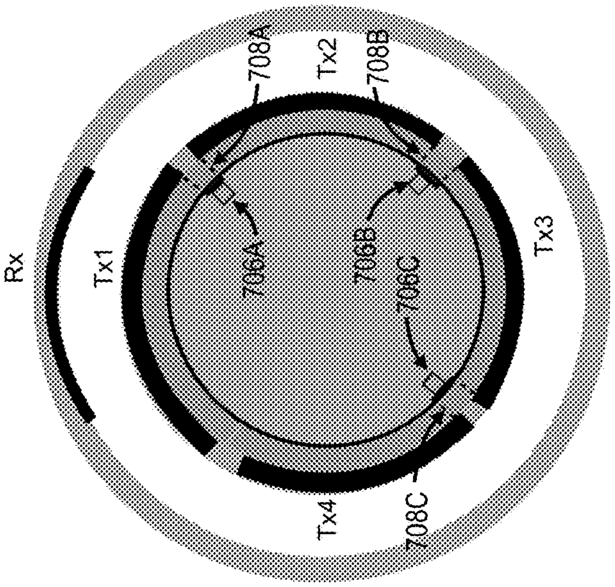

FIGS. 7A-7B illustrate non-limiting example embodiments of a circuit schematic and a top view depicting the NFC smart ring charger configured with a series feeding solution for the multiple Tx antennas. The solution of having the antennas all paralleled into the DPXT switch and fed from the single NFC chip costly as the DPXT switch is an expensive component. The parallel configuration illustrated in FIGS. 5A-5B also requires available space in the charger island to incorporate the DPXT switch, the larger antenna configuration, and the multiple feed lines. In some embodiments, alternative to the parallel connection of the Tx antennas, the Tx antennas Tx1, Tx2, Tx3, and Tx4 can be connected together in a series configuration as shown in FIG. 7B. Accordingly, in some embodiments, this enables a smaller overall antenna footprint with less feed lines and a small flex tail 710.

In some embodiments, FIG. 7B depicts the four Tx antennas connected in series with single pole double throw (SPDT) switches (702A-702C and 704A-704C) physically located on the bottom FPC layer 606. The SPDT switches S_i (702A-702C) are located on the incoming current coupling lines and the SPDT switches S_r (704A-704C) are located on the outgoing coupling lines. The SPDT switches are arranged in the circuit such that Tx1 can be activated by switching 702A and 704A, Tx2 can be selected by switching 702B and 704B, Tx3 can be selected by operating SPDT switches 702C and 704C, and Tx4 can be a further modification of the SPDT switches. This series configuration shown in FIG. 7B reduces the size of the Tx antenna footprint and antenna flex tails. In addition to a footprint reduction when compared to the parallel configuration presented in FIG. 5B, the SPDT switches are much less expensive than the single DPXT switch.

According to some embodiments, FIG. 7A illustrates the location and arrangement of the SPDT switches (706A-706C) along the layer of conductive sheet (FPC) that surrounds the charger island. These SPDT switches are smaller and less expensive than the single SPXT switch that would be required in the parallel antenna configuration of FIGS. 5A-5B. The coupling lines that connect the SPDT switches to the Tx antennas are shown with the dashed lines (708A-708C) and extend through the ferrite sheet from the bottom FPC to the top FPC where the Tx antennas reside. The SPDT switches are arranged in the NFC circuit in order to select which antenna patterns to activate based on the orientation of the smart ring Rx antenna in relation to the charger island. In both the parallel and series connected Tx antenna diversity designs described herein, the antenna NFC chip automatically detects which Tx antenna has the best mutual coupling with relation to the smart ring Rx antenna.

Figure 8B:
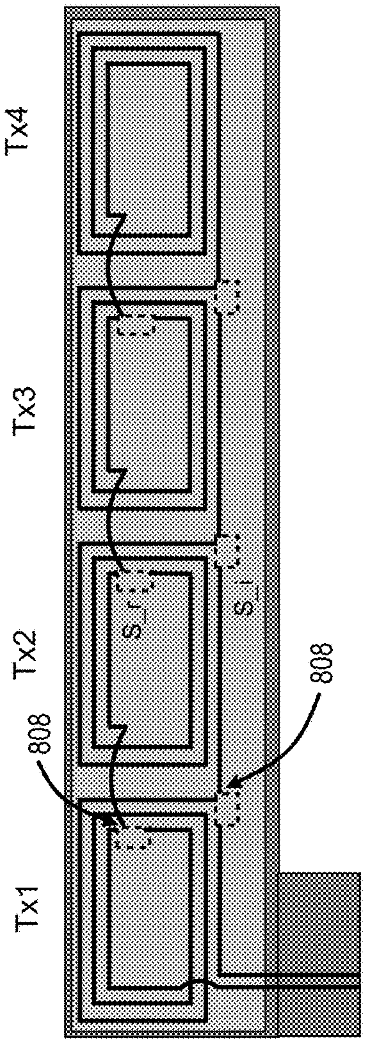
FIGS. 8A-8B illustrate a circuit schematic and a cross section of the multiple Tx antennas connected in series and providing charging diversity according to some embodiments of the present disclosure.
Figure 8A:
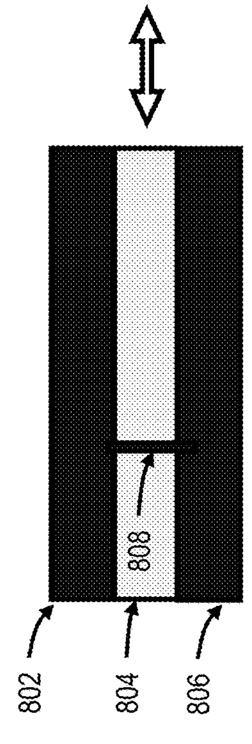

FIGS. 8A-8B illustrate non-limiting example embodiments of a circuit schematic and a cross section of the multiple Tx antennas connected in series and providing charging diversity. In some embodiments, FIG. 8A depicts the layers that comprise the Tx antenna configuration wherein the top layer is the FPC 802 which supports the Tx antenna pattern including Tx1, Tx2, Tx3, and Tx4 and associated antenna lines. Located below the top layer is the ferrite sheet 804 which is typically 30~200 micrometers and also prevents the Tx antenna patterns 802 from inducing currents on the bottom FPC 806 that in turn would cancel the magnetic fields from the top antenna FPC 802. The bottom FPC 806 provides shielding from the Tx antennas coupling to one another and creates a semi faraday cage for component placement on the FPC. In some embodiments, the FPCs illustrated in FIG. 8A can be a single layer or multilayer based on the need for dielectric between conductive layers. The dielectric will be designed and implemented in order to provide isolation that is needed on each layer. The SPDT switches are located on the bottom FPC 806 and the coupling lines that connect the SPDT to the Tx antennas is routed through a via in the ferrite sheet 808. According to some embodiments, a via is a hole or void made in a substrate to allow the antenna feed to pass through, the substrate in this case is the ferrite sheet.

In some embodiments, FIG. 8B is the similar series connected antenna circuits as what is illustrated on FIG. 7B wherein position of the many SPDT switches are used to select the correct antenna pattern. It should be recognized to those skilled in the art that this figure includes four antenna patterns but this design can include any number of antenna patterns and the number of antenna patterns can be customized to accommodate the varying size of the Rx antenna associated with the smart ring. In some embodiments, the control of the SPDT switches is from the NFC chip where the NFC circuit can select the appropriate antenna pattern for optimized mutual coupling between the Tx antennas and the Rx antennas associated with the ring and dependent upon the orientation of the Rx antenna to the charger island.

Figure 9A:
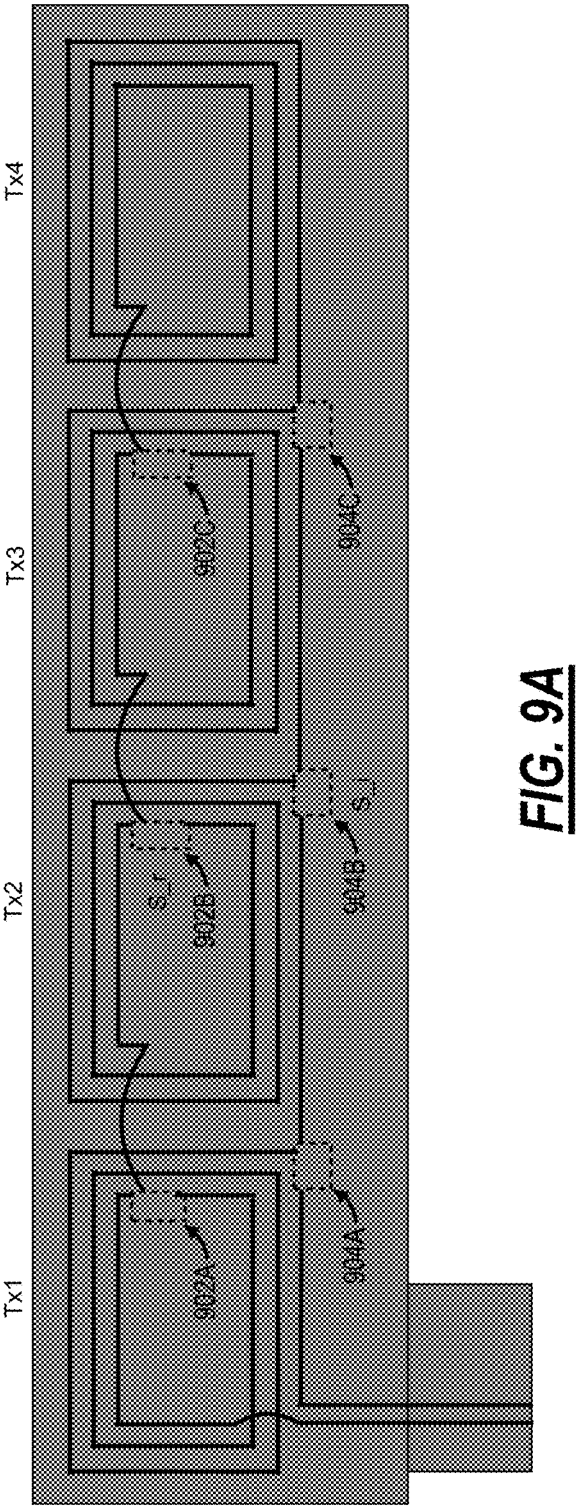
FIGS. 9A-9B illustrate the series antenna circuitry schematic from a top side view and a back side view according to some embodiments of the present disclosure.
Figure 9B:
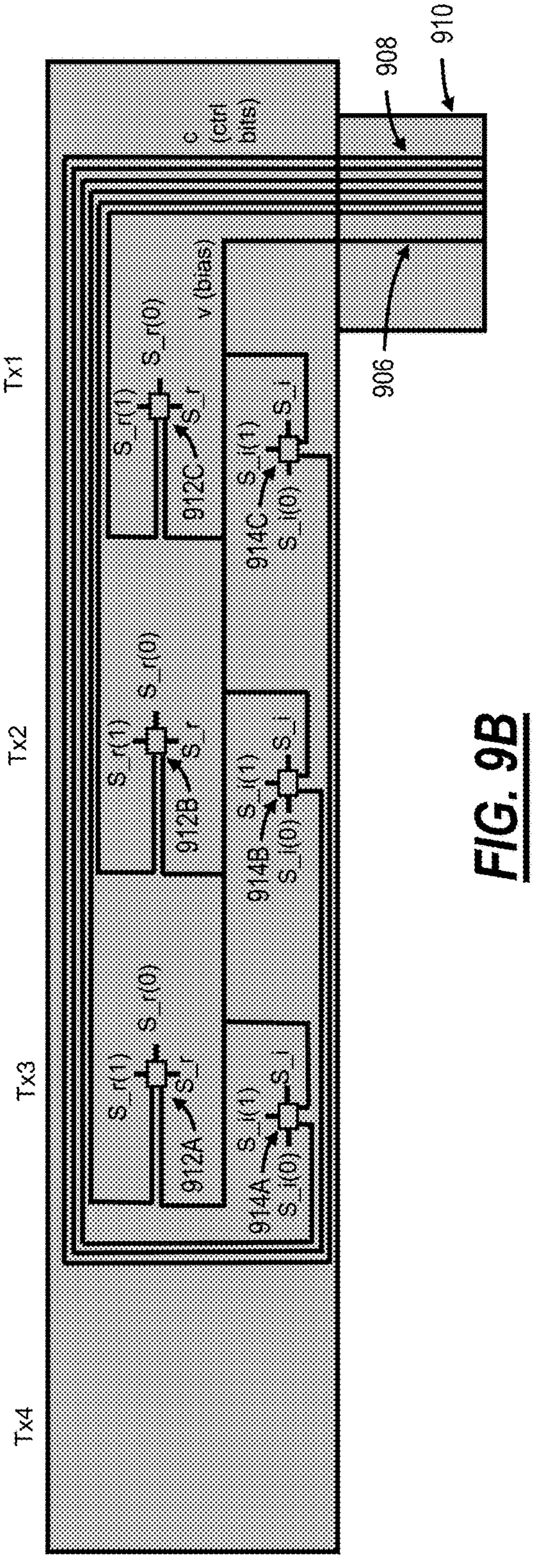

FIGS. 9A-9B illustrate non-limiting example embodiments of the series antenna circuitry schematic from a top side view and a back side view. In some embodiments, FIG. 9A illustrates the circuit schematic for the top FPC including the antenna patterns configured in series with the SPDT switches implemented. The SPDT switches are shown integrated into the circuit but are represented in dashed lines to show the location being on a different layer located on the bottom FPC. The SPDT switches are located along the antenna patterns wherein one switch, referred to as the incident switch (S_i) 904A-904C switches the feed current and directs the feed current into the appropriate antenna pattern (Tx1, Tx2, Tx3, or Tx4). There also exists an SPDT switch which can switch the current returning to the NFC chip which is referred to as the signal return switch (S_r) 902A-902C.

In some embodiments, FIG. 9B illustrates the circuit schematic for the bottom FPC including the SPDT switches and ancillary circuitry necessary for operation of the SPDT switches. The incident switches (S_i) 914A-914C and signal return switches (S_r) 912A-912C are shown with circuitry shown that allow operation of the individual SPDT. The SPDTs can operate in two positions (single pole) where circuit lines required to accomplish that switching is shown 908 and the SPDT switches also require a bias voltage feed circuit 906 wherein all circuits are fed from the NFC chip. The switches are controlled by the antenna NFC chip on the PCB board which change the state of the SPDT switches by control bits (either 1 or 0) which change the position of each individual SPDT switch. The SPDT switches need individual flex PCB circuits for the control bit leads from the NFC chip to each switch represented by the lines shown 908. The control bit circuits 908 and the voltage feed circuit 906 connect from each individual SPDT switch on the bottom PCB to the NFC chip by a flex PCB 910.

Figure 10:
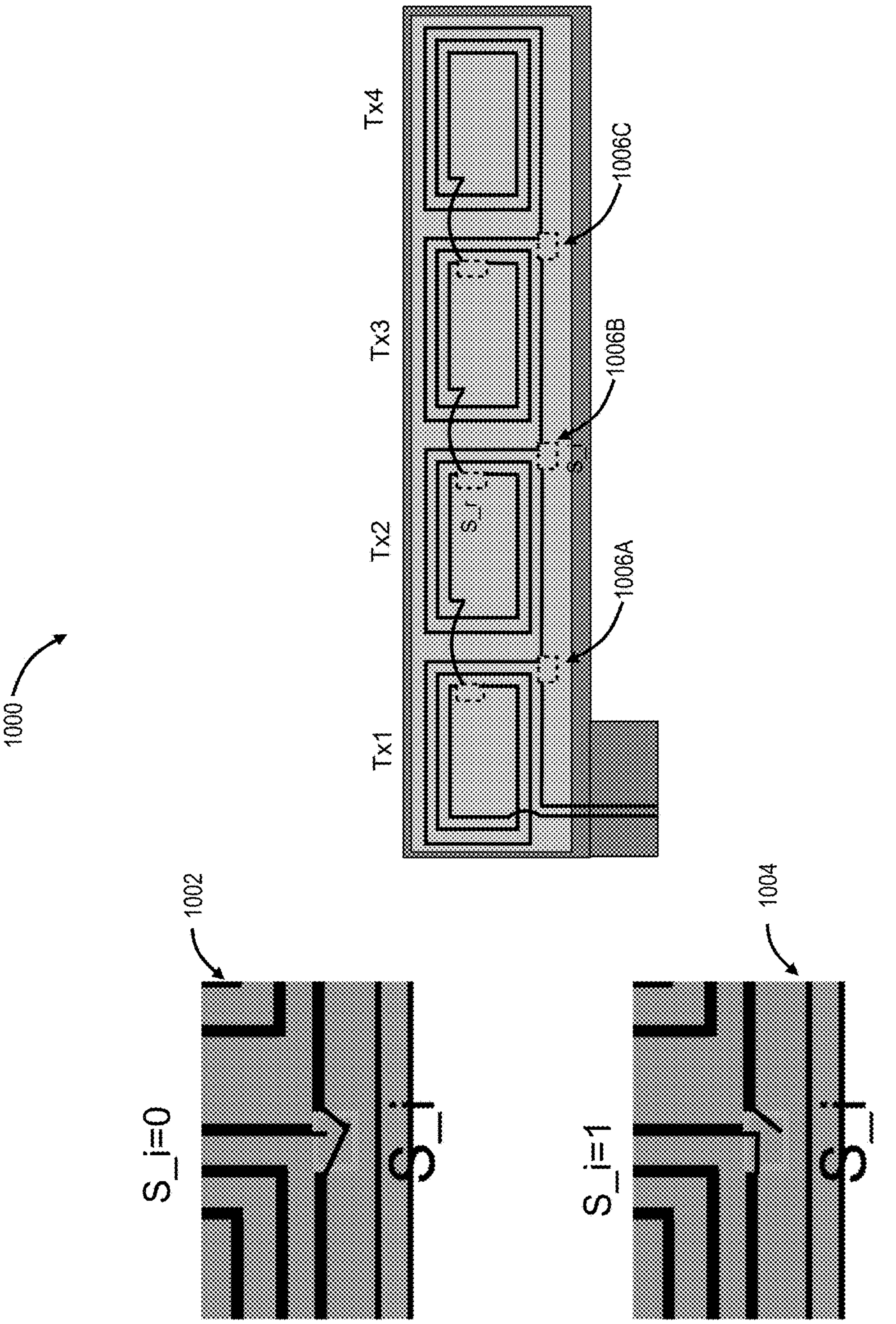
FIG. 10 is depicts an embodiment of the series configured charging antennas depicting different states of the incident switch (S_i) according to some embodiments of the present disclosure.

FIG. 10 is another non-limiting example embodiment of the series configured charging antennas depicting different states of the incident switch (S_i). The possible positions are shown with S_i control bit=0 (1002) and S_i control bit=1 (1004). Where S_i position is set to 0 the current feed from the NFC chip to the antenna circuits will be passed through to the next antenna and not allow current to flow to the Tx antenna that the S_i switch is associated with. For example, where the S_i switch 1006A is set to 0 the feed current will continue to the next S_i switch, and if the next S_i switch 1006B is set to 0 the current feed will flow to the next S_i switch and so on. Where the S_i position is set to 1 the current from the NFC chip will travel to the Tx antenna that the S_i switch is associated with for instance if S_i switch 1006A is set to 1 than the current feed will flow to the Tx1 antenna. If 1006A is set to 0 and 1006B is set to 1 than the current feed will flow to the Tx2 antenna. If all the S_i switches are set to 0 current will flow to the Tx4 antenna.

Figure 11:
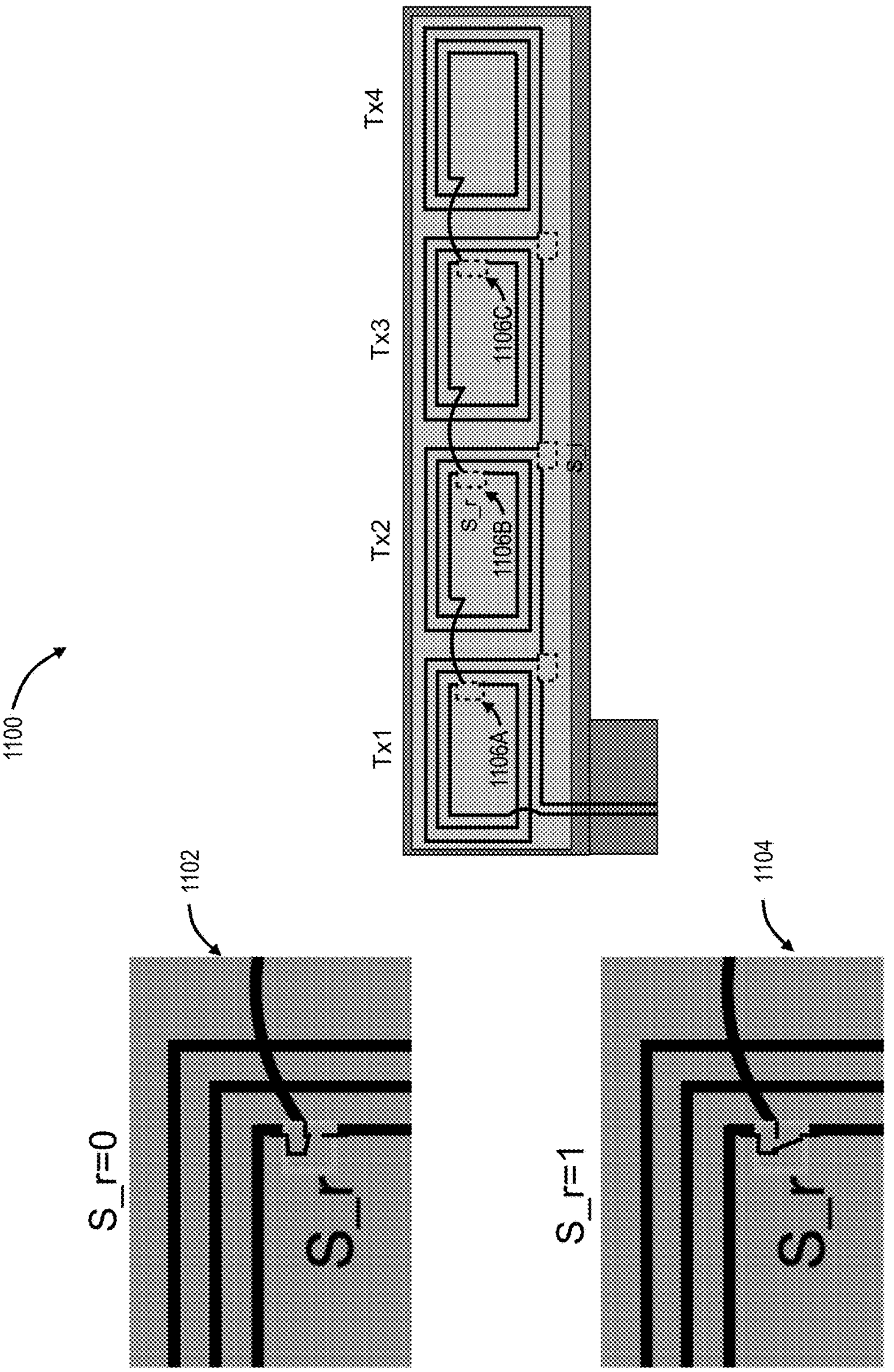
FIG. 11 is depicts an embodiment of the series configured charging antennas depicting different states of the signal return switch (S_r) according to some embodiments of the present disclosure.

FIG. 11 is another non-limiting example embodiment of the series configured charging antennas depicting different states of the signal return switch (S_r). The possible positions are shown with S_r control bit=0 (1102) and S_r control bit=1 (1104). Where the S_r position is set to 0 the return current from the Tx antenna circuit to the NFC chip will be passed through to the next antenna. Where the S_i position is set to 1 the return current from the antenna to the NFC chip will travel to the Tx antenna that the S_i switch is associated with. For example, when the S_r switch 1106A is set to 0 the Tx antenna feed return will be open but the antenna return connection to Tx2 will pass through the Tx1 pattern to the NFC return. If 1106A is set to 1 the Tx1 antenna circuit will be connected to the NFC return lines and if 1006A S_i switch is set to 1 than Tx1 will be energized via the NFC chip. There are many different combinations of on/off or 0/1 for the control bits associated with the S_i and S_r SPDT switches in order to select the Tx antenna that pairs with the Rx antenna on the smart ring. This control is performed by the NFC chip on the RF PCB. The S_r switch is required to close the antenna loop back to the NFC chip and the S_i switch is required to feed the appropriate antenna circuit.

Figure 12:
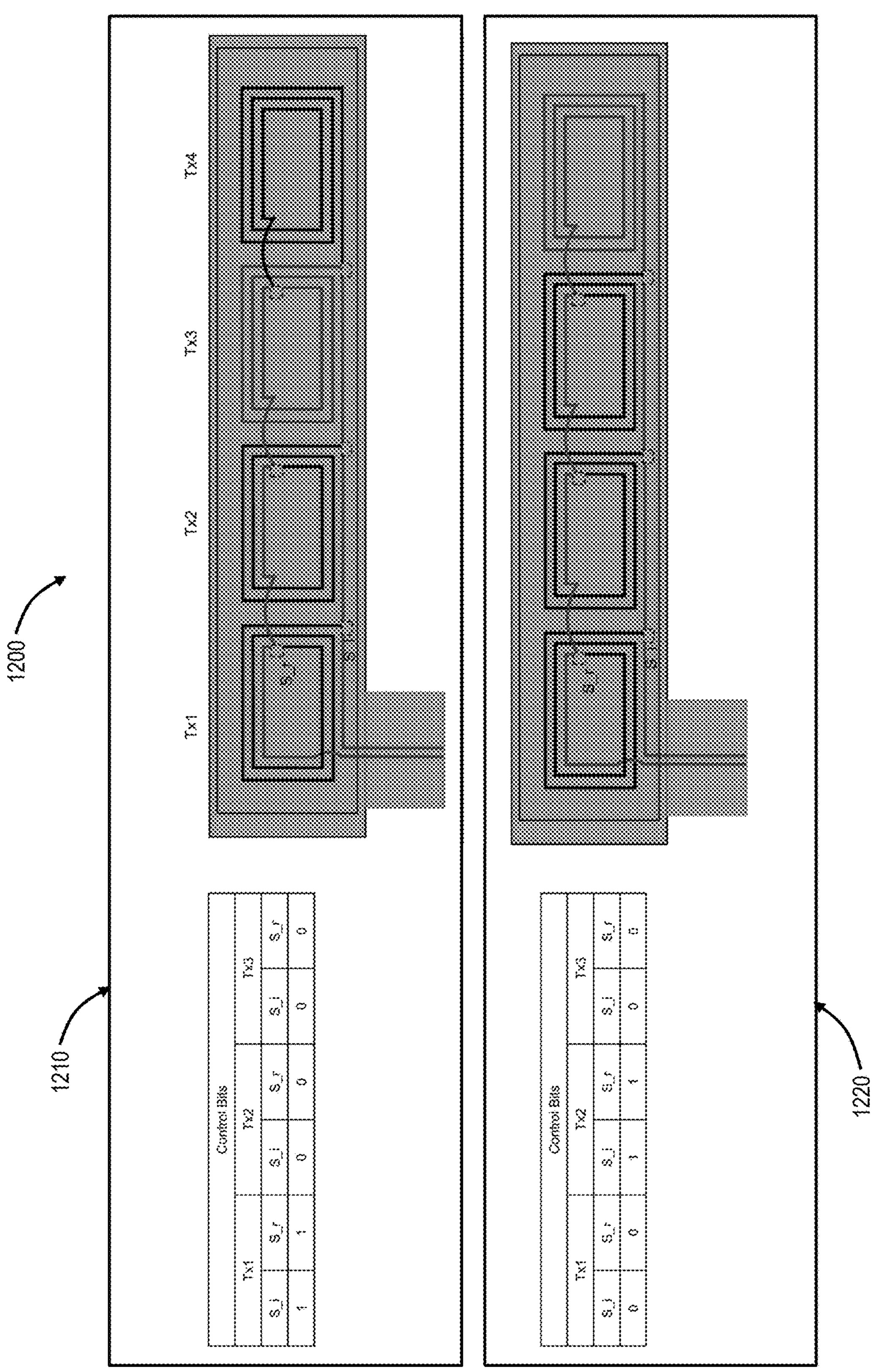
FIG. 12 is the series configured Tx antennas illustrating the current flow and depicting the control bit arrangement to activate the Tx1 and Tx2 antennas according to some embodiments of the present disclosure.

FIG. 12 is a non-limiting example embodiment depicting the series configured Tx antennas illustrating the current flow and depicting the control bit arrangement to activate the Tx1 and Tx2 antennas. The antenna circuit schematic and control bit table to enable the Tx1 antenna is shown in 1210. As shown each SPDT switch gets control bits associated with the individual S_i and S_r SPDT switches in order to select the appropriate antenna pattern (Tx1, Tx2, Tx3, and Tx4). In the illustration 1210 the switch status (1 or 0) is shown in a control bit table where the Tx1 S_i and S_r SPDT switches are set to 1 and all other switches are set to 0. As detailed in FIG. 10 and FIG. 11, discussed supra, where the Tx1 S_i position is set to 1 the current from the NFC chip will travel to the Tx1 antenna and where the Tx1 S_r position is set to 1 the return current will flow back to the NFC chip. The antenna circuit schematic is shown where the lightly colored antenna pattern represents the antenna that is active based on the control bits selected in the control bit table. This control bit configuration will activate the SPDT switches necessary to activate Tx1, wherein Tx1 will mutually couple to the Rx antenna on the smart ring.

The antenna circuit schematic and control bit table to enable the Tx2 antenna is shown in 1220. As shown each Tx antenna (Tx1, Tx2, and Tx3) has control bits associated with the individual S_i and S_r SPDT switches. In the illustration 1220 the switch status (1 or 0) is shown in a control bit table where the Tx2 S_i and S_r SPDT switches are set to 1 and all other switches are set to 0. As detailed in FIG. 10 and FIG. 11, discussed supra, where the Tx2 S_i position is set to 1 the current from the NFC chip will travel to the Tx2 antenna and where the Tx2 S_r position is set to 1 the return current will flow back to the NFC chip. The Tx1 S_i and S_r SPDT switches also affect the operation of the Tx2 antenna and both of those switches being set to 0 allow the current to bypass Tx1 and flow to Tx2 and return from Tx2 to the NFC chip. The antenna circuit schematic is shown where the lightly colored antenna pattern represents the antenna that is active based on the control bits selected in the control bit table. This control bit configuration will activate the SPDT switches necessary to activate Tx2, wherein Tx2 will mutually couple to the Rx antenna on the smart ring. It should be noted that this design can also apply to more Tx antennas by adding more SPDT switches for each new Tx antenna.

Figure 13:
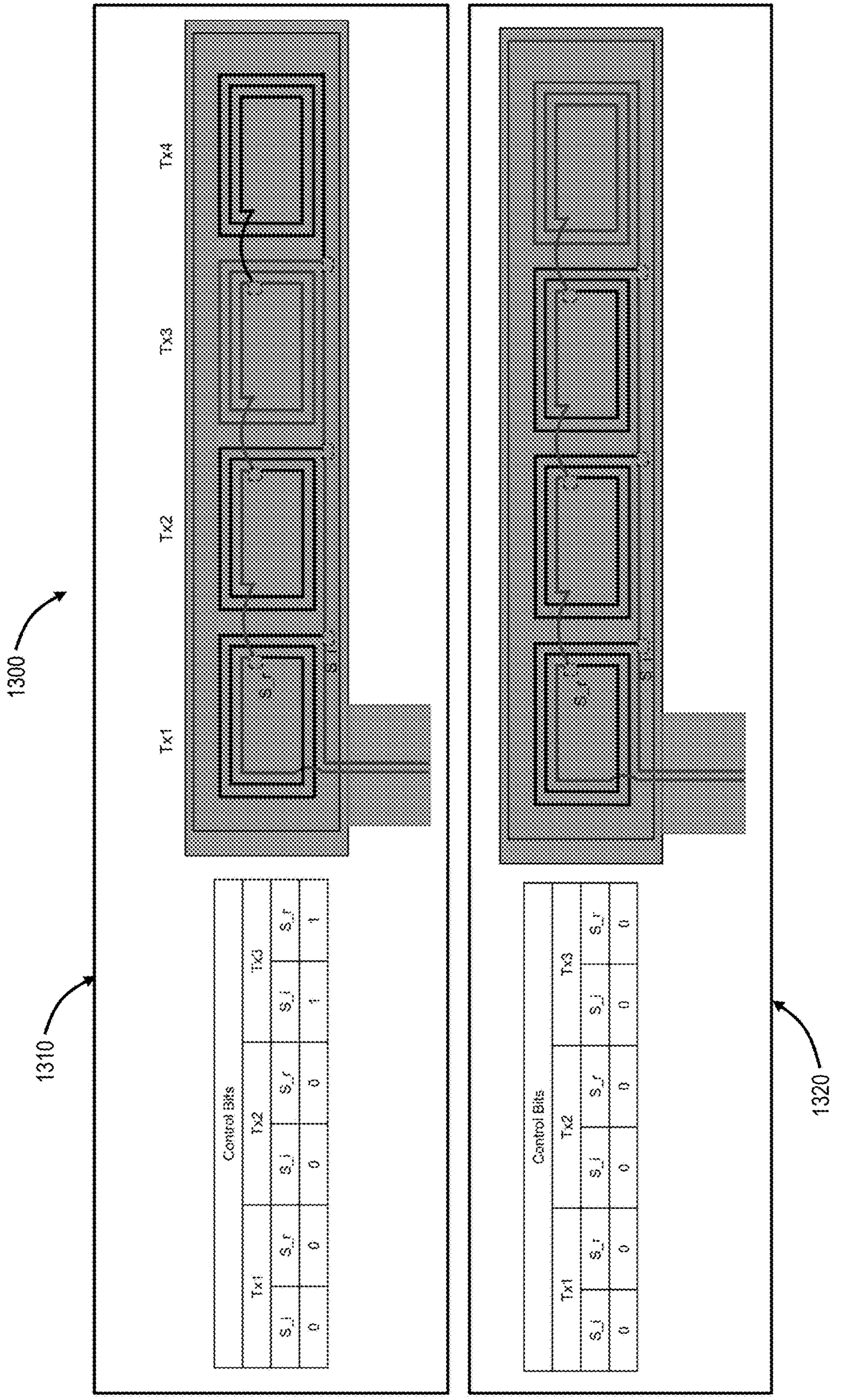
FIG. 13 is the series configured Tx antennas illustrating the current flow and depicting the control bit arrangement to activate the Tx3 and Tx4 antennas according to some embodiments of the present disclosure.

FIG. 13 is a non-limiting example embodiment depicting the series configured Tx antennas illustrating the current flow and depicting the control bit arrangement to activate the Tx3 and Tx4 antennas. The antenna circuit schematic and control bit table to enable the Tx3 antenna is shown in 1310. As shown each Tx antenna (Tx1, Tx2, and Tx3) has control bits associated with the individual S_i and S_r SPDT switches. In the illustration 1310 the switch status (1 or 0) is shown in a control bit table where the Tx1 S_i and S_r SPDT switches are set to 1 and all other switches are set to 0. As detailed in FIG. 10 and FIG. 11, discussed supra, where the Tx3 S_i position is set to 1 the current from the NFC chip will travel to the Tx3 antenna and where the Tx3 S_r position is set to 1 the return current will flow back to the NFC chip. The Tx1 and Tx2 S_i and S_r SPDT switches also affect the operation of the Tx3 antenna and the switches associated with Tx1 and Tx2 being set to 0 allow the current to bypass Tx1 and Tx2 and flow to Tx3 and return from Tx3 to the NFC chip. The antenna circuit schematic is shown where the lightly colored antenna pattern represents the antenna that is active based on the control bits selected in the control bit table. This control bit configuration will activate the SPDT switches necessary to activate Tx3, wherein Tx3 will mutually couple to the Rx antenna on the smart ring.

The antenna circuit schematic and control bit table represents the control bits necessary to enable the Tx4 antenna is shown in 1320. As shown each Tx antenna (Tx1, Tx2, and Tx3) has control bits associated with the individual S_i and S_r SPDT switches. In the illustration 1320 the switch status (1 or 0) is shown in a control bit table where the S_i and S_r SPDT switches are all set to 0. As detailed in FIG. 10 and FIG. 11, discussed supra, where all the Tx S_i positions are set to 0 the current from the NFC chip will travel to the Tx4 antenna and where all the Tx S_r positions are set to 0 the return current will flow back to the NFC chip from the Tx4 antenna. The antenna circuit schematic is shown where the lightly colored antenna pattern and lines represents the antenna that is active based on the control bits selected in the control bit table. This control bit configuration of all zeros will activate Tx4, wherein Tx4 will mutually couple to the Rx antenna on the smart ring. It should be noted that this design can also apply to more Tx antennas by adding more SPDT switches for each new Tx antenna.

Figure 14:
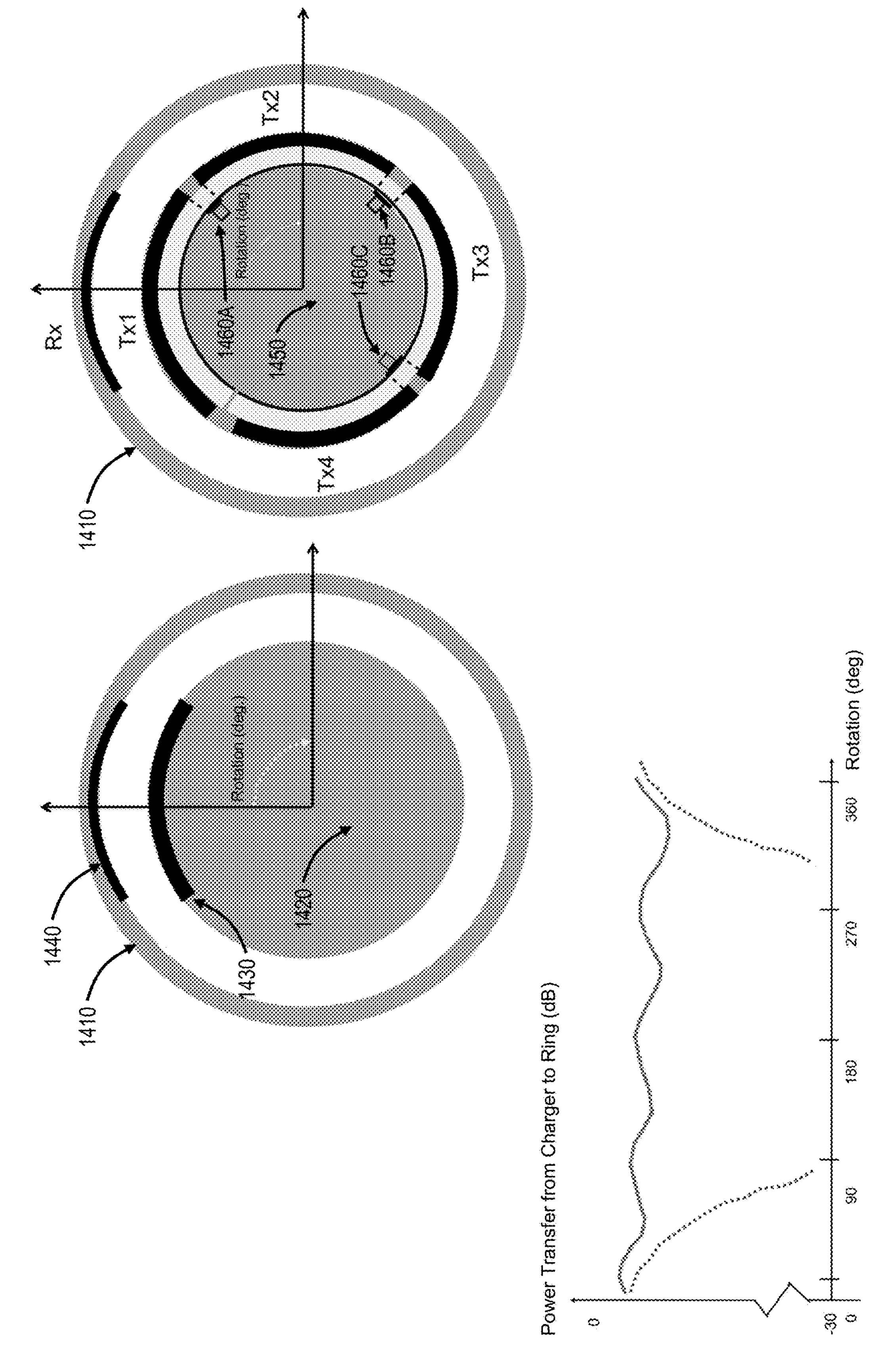
FIG. 14 illustrates a non-limiting example embodiment of a power transfer via a charging configuration according to some embodiments of the present disclosure.

According to some embodiments, FIG. 14 illustrates non-limiting examples associated with the disclosed power transfer via embodiments of the charging configurations, discussed herein. In some embodiments, as depicted in FIG. 14 and discussed herein, the power transfer that occurs with the existing industry charging configuration can be compared to the series Tx antenna configuration of the instant application, where the ring Rx antenna can be oriented in different degrees around the charger island.

As depicted in FIG. 14, the smart ring 1410 and the charger island 1420 represent the existing industry solution for charging where the single Tx antenna associated with the charger island 1430 needs to be aligned with the Rx antenna on the smart ring 1440. The power transfer from charger to ring is shown graphed in the lower left of the drawing where dB is on the Y axis and the rotation of the ring Rx antenna in relation to the charger Tx antenna is on the X axis. The ring rotation is scaled from 0 deg to 360 deg where 0 degrees represents the ring Rx antenna aligned with the charger island Tx antenna as shown in 1440 and the degree rotation is in the clockwise direction from the 0 degree (12:00 position). The power transfer for the existing industry charging solution utilizing one Tx charging antenna 1430 vs. the ring Rx antenna orientation is depicted in the graph on the bottom left of FIG. 14 as dotted lines. It can be observed that the power transfer decreases greatly from 0 degrees (perfect alignment) to 90 degrees of misalignment, and between 90 degrees and 270 degrees there is approximately no power transfer. The power transfer then increases between 280 degrees to 360 degrees wherein 360 degrees is back to full alignment between the Tx antenna on the charger and the Rx antenna on the smart ring. This power transfer graph proves that misalignment of the charger Tx antenna with the smart ring Rx antenna can greatly affect the ability of the charger to transfer power wirelessly to the smart ring.

In some embodiments, the same smart ring 1410 is shown in the top view on the far right of the drawing, however in this illustration the series configured Tx antennas (Tx1, Tx2, Tx3, and Tx4) are implemented into the charging island 1450. In some embodiments, the SPDT switches 1460A-1460C as described in FIG. 8A through FIG. 14 are implemented onto the bottom FPC and the coupling lines between the SPDT switches and the antenna patterns are indicated in dashed lines that are routed through the ferrite sheet. The power transfer from charger to ring is shown graphed in the lower left of the drawing where dB is on the Y axis and the rotation of the ring Rx antenna in relation to the charger Tx antenna is on the X axis. The power transfer from charger to ring is represented by the solid line for the series configured Tx antennas shown. As observed in the graph the power transfer function is almost independent of ring rotation for the series configured Tx antennas with the SPDT switches implemented on the bottom FPC. In some embodiments, there can be slight decreases in dB between 0 degree and 45 degrees but that represents where the smart ring Rx antenna is aligned between two of the charger Tx antennas.

For example, if the smart ring Rx antenna was aligned between Tx1 and Tx2, this would be represented as 45 degrees on the graph. As the smart ring Rx antenna is rotated past 45 degrees the power transfer increases and almost goes back to a peak power transfer at approximately 90 degrees. This peak power transfer represents where Tx2 antenna would be aligned with the Rx antenna and mutual coupling between the two antennas would occur. The power transfer function for the series Tx antennas indicated with the solid line on the graph trends mildly downwards on the Y axis between the full 0 degree to 360 degree rotation. This downward trend in dB in the power transfer is due to the increased antenna feed line length from Tx1 to Tx2 (0 degree to 315 degree), wherein the increased impedance is affecting the power transfer slightly. The power transfer dB from 315 degrees to 360 degrees starts trending upwards due to the feed lines being shorter when the Tx1 antenna is activated as the smart ring Rx antenna is positioned closer to that Tx antenna.

The minimum power transfer that can be observed for the series connected Tx antennas occurs where the Rx smart ring antenna is in between the individual Tx antennas. As shown on the dB vs. degree graph in the bottom left of FIG. 14, at 45 degrees, 135 degrees, 225 degrees, and 315 degrees the local minimum power occurs as those are alignments where the Rx antenna is in between two Tx antennas. Similarly, at 0 degrees, 90 degrees, 180 degrees, 270 degrees, and 360 degrees the local maximum power transfer occurs. The series connected Tx antennas are still at a much greater power transfer level than the single Tx antenna configuration and any misalignment of the smart ring Rx antenna to the charger island Tx antenna affects the power transfer only slightly. The series Tx antenna configuration gives the charger island a great deal of diversity and represents a seamless solution where misalignment of the ring Tx to the charger island Tx is no longer a concern and mechanical means of keeping the ring aligned with the charger island could be removed entirely.

Figure 16:
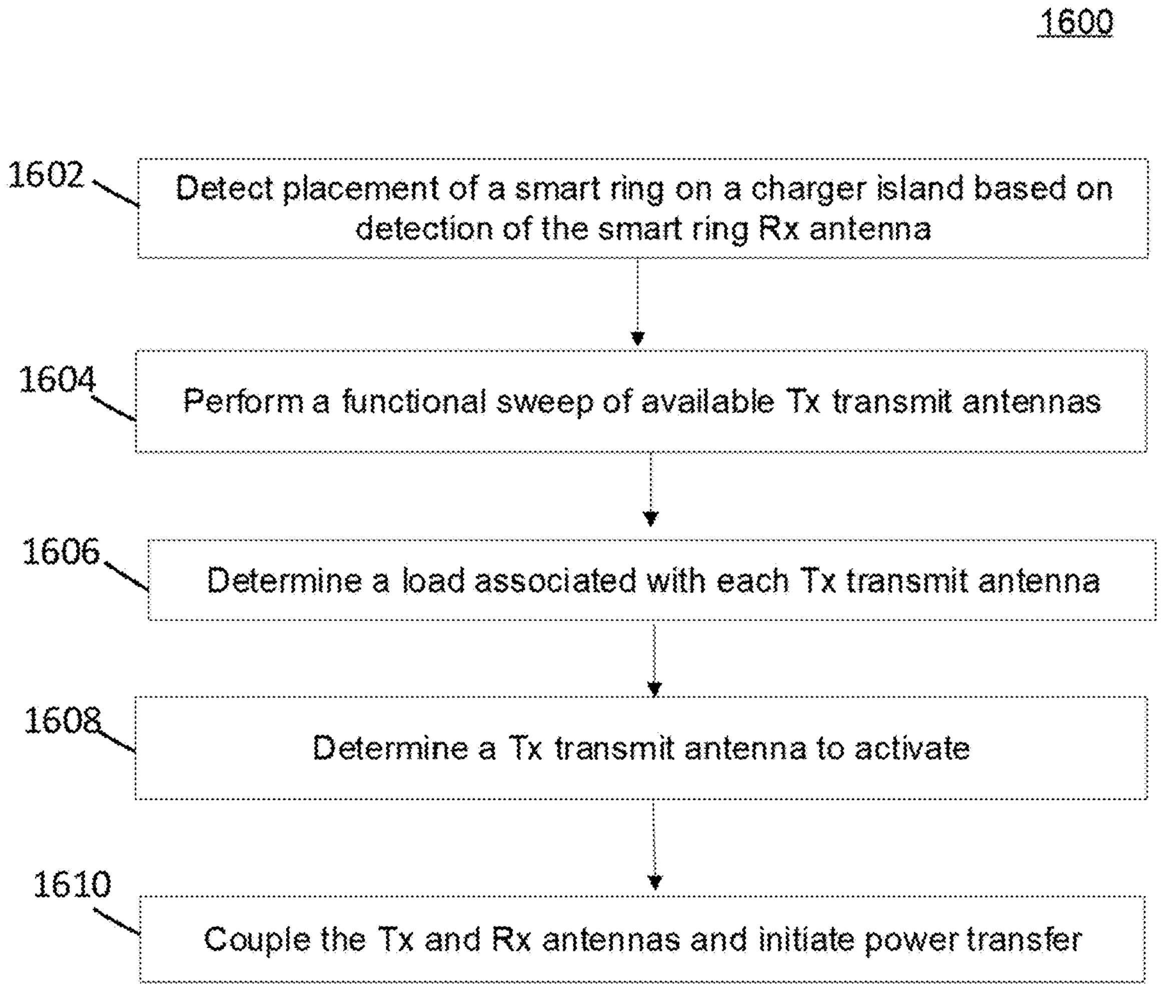
FIG. 16 depicts a an exemplary workflow according to some embodiments of the present disclosure.

Turning to FIG. 16, depicted is Process 1600 which provides an algorithm for deciding which charger island Tx antenna to turn on. According to some embodiments, the computer-executable steps discussed in relation to Process 1600 can be executed by, but not limited to, a processor or circuitry associated with the smart ring charger and/or a paired or connected device (e.g., a user's smartphone that is paired with the charger), and the like, or some combination thereof. Thus, in some embodiments, the computer-executable instructions associated with the algorithm of Process 1600 can be executed so as to effectuate the disclosed charging and power transfer, as discussed herein.

According to some embodiments, Process 1600 begins with Step 1602 where placement of the smart ring on the charger island is detected. According to some embodiments, such detection is enabled and/or effectuated via the Rx antenna on the smart ring being sensed by the antenna NFC chip.

In Step 1604, upon sensing of the smart ring, a functional sweep of the available Tx transmit antennas can be performed. As discussed above, the available Tx transmit antennas can be any number of Tx transmit antennas physically arranged among any 360 degree circumference. Thus, in some embodiments, the sweep can be performed according to such degree-based circumference.

In some embodiments, the Tx transmit antennas can have built in functions to sense the Rx antenna load. In some embodiments, the sweep performed in Step 1604 can be controlled by the NFC chip and can involve detection, determination or otherwise identification of the load associated with each Tx transmit antenna. In some embodiments, the speed of the sweep can be at a speed proportional to the capabilities of the NFC chip in detecting a load from an antenna, as discussed herein. In some embodiments, the sweep can occur according to a predetermined order (e.g., an order of the Tx transmit antennas in a clockwise manner, for example), based on a provided input, or randomly, and the like, or some combination thereof.

In Step 1606, based on the sweep performed in Step 1604, a load associated with each Tx transmit antenna can be determined. As discussed above, during the sweep, each Tx transmit antenna can be pinged via the NFC chip so as to determine the available load associated with each Tx transmit antenna. In some embodiments, Step 1606 can involve the compilation of the load data collected from each TX ping executed by the NFC chip.

In Step 1608, a determination is made as to which Tx transmit antenna to activate. As discussed herein, the determination in Step 1608 can be based on, but not limited to, the load of each Tx transmit antenna, the position of each Tx transmit antenna to the Rx antenna, the position of each Tx transmit antenna to another Tx transmit antenna, and the like, or some combination thereof. In some embodiments, only one Tx transmit antenna can be on at a time. In some alternative embodiments, a set of Tx transmit antennas may be activated simultaneously, in an overlapping, time-based manner, or sequentially, which can be based on a position of the Rx antenna in relation to the set of Tx transmit antennas.

By way of a non-limiting example, in a scenario where the smart ring is placed such that the load is sensed equally by the two adjacent Tx antennas (such as if the ring Rx antenna is at the 45 degree angle between Tx1 and Tx2) the current draw will be observed and the Tx antenna which draws the most current will be turned on by operating the SPDT switches. Note that the Tx which draws the most current equates to the best coupling between the Tx and Rx antennas. In some alternative embodiments, according to a non-limiting example, Tx antennas Tx1 and Tx2 may be simultaneously powered so as to share the load in transferring power to the smart ring (which can be proportional to the angle degree to the ring Rx, for example).

Accordingly, in some embodiments, Step 1608 involves sensing which Tx transmit antenna has the most load, and activating (e.g., turning on for power charging) such Tx transmit antenna. In some embodiments, if the load of a Tx transmit antenna is within a predetermined range of another Tx transmit antenna's load, and the other Tx transmit antenna is physically located closer to the Rx antenna, than that other Tx transmit antenna may be activated.

In Step 1610, the turned on/activated Tx transmit antenna can be coupled to the Rx antenna, whereby a power transfer related to charging the smart ring is initiated, as discussed herein. In some embodiments, such power transfer from the Tx transmit antenna to the Rx antenna can be effectuated via the associated SPDT switch and control bits assigned to all the SPDT switches.

Figure 15:
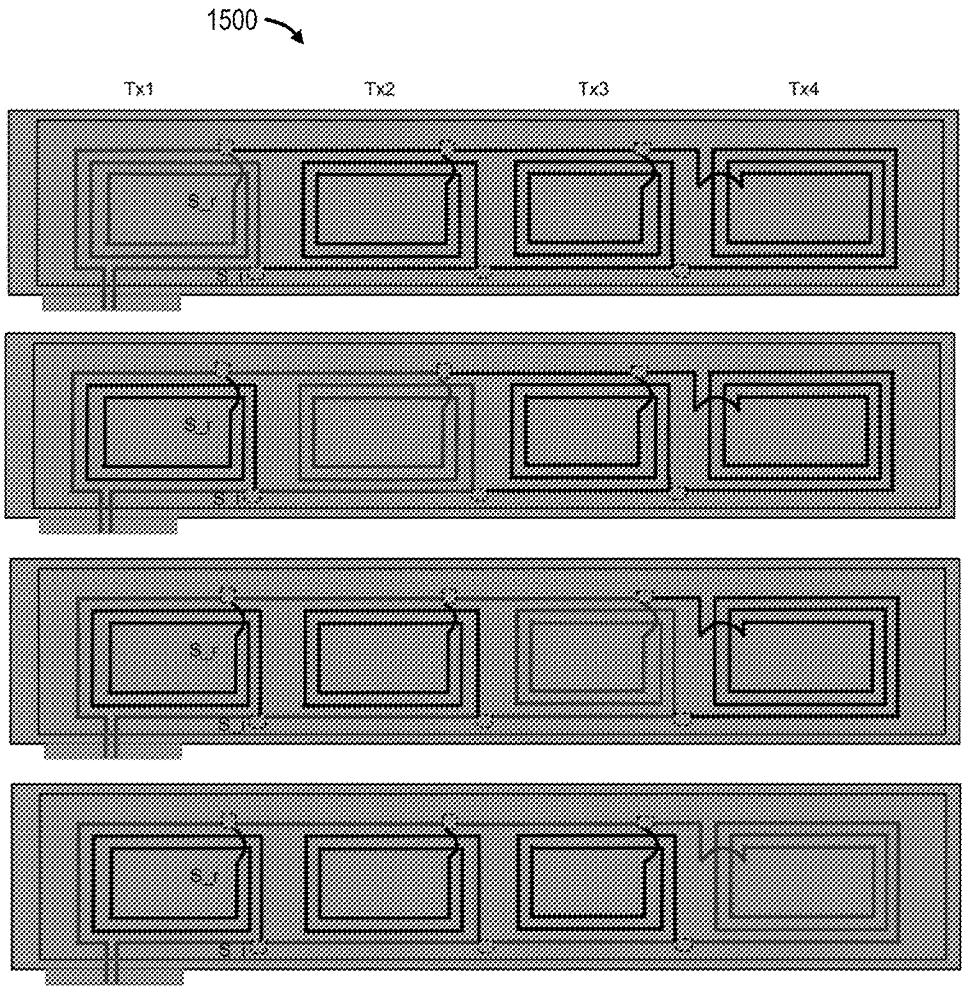
FIG. 15 illustrates a non-limiting example embodiment of a Tx antenna pattern utilizing the series antenna diversity configuration and SPDT switches according to some embodiments of the present disclosure.

According to some embodiments, FIG. 15 illustrates an alternative Tx antenna pattern utilizing the series antenna diversity configuration and SPDT switches. The antenna patterns shown differ from the patterns shown previously in FIG. 12 and FIG. 13 as the straight lines are shown between the S_r switches and located at the outside of the antenna pattern. The active Tx pattern is shown as lightly colored lines and the control bits to activate each Tx antenna is shown next to the associated antenna circuit schematic. In some embodiments, the SPDT control bits that are necessary to activate each antenna is the same as the antenna patterns shown in FIG. 12 and FIG. 13. In some embodiments, the same controls bits and SPDT configuration that was used to select the Tx antennas in FIG. 12 and FIG. 13 can be used for the antenna pattern in 1500. In some embodiments, the flexibility to modify the antenna patterns for the Tx antennas while using the same SPDT switches give the antenna designer options to design antennas for different physical configurations.

Accordingly, it should be noted that the number of Tx antennas are not limited to four (4) as shown in 1500. One of skill in the art would readily understand the number of Tx antennas can be any number of antennas to properly match the size of the smart ring Rx antenna. In some embodiments described herein, the charger and charging island is described for charging a smart ring. Those skilled in the art will appreciate the charger, charging island and antenna diversity can be adapted for any compact user-wearable devices, such as, without limitation, rings, earbuds, heart monitors, emergency alert systems, smart watches, smart bracelets, and the like.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein with reference to the disclosed embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the disclosed embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for the disclosed embodiments and those skilled in the art will appreciate these disclosed embodiments may be used in combination with one another as well as individually.

What is claimed is:

1. A charger for a smart ring, the charger comprising:

a charger;

a charger island disposed on the charger, wherein the charger island has a substantially circular shape and is configured to receive the smart ring;

a plurality of transmit antennas located in association with the charger island, wherein an active transmit antenna of the plurality of transmit antennas is configured to couple with a receive antenna on the smart ring for charging thereof;

a near field communications circuit coupled to the plurality of transmit antennas via one or more switches;

wherein the active transmit antenna is based on settings of the one or more switches; and a ferrite sheet having antenna pattern lines thereon for the plurality of transmit antennas;

wherein the one or more switches are a plurality of single pole double throw (SPDT) switches, configured to switch between corresponding antenna pattern lines.

2. The charger of claim 1, wherein the active transmit antenna is based on an orientation of the smart ring on the charger island, such that the charging is performed regardless of alignment between the ring and the charger island.

3. The charger of claim 1, further comprising:

a conductive sheet between the plurality of transmit antennas and an interior of the charger island, to isolate the plurality of transmit antennas from one another.

4. The charger of claim 1, wherein the Near Field Communications circuit, coupled to the plurality of transmit antennas, is configured to detect which of the plurality of transmit antennas should be the active transmit antenna.

5. The charger of claim 1, wherein the one or more switches are the plurality of single pole double throw (SPDT) switches, each configured to switch between coupling lines of the plurality of transmit antennas.

6. The charger of claim 1, wherein the plurality of SPDT switches are connected to the antennas through a via in the ferrite sheet.

7. The charger of claim 1, wherein at least a portion of the plurality of transmit antennas are located in the charger island.

8. A method comprising:

detecting placement of a smart ring on a charger island of a charging device, the detection comprising detecting, via a Near Field Communication (NFC) chip associated with the charging device, a receive antenna associated with the smart ring;

executing, via the NFC chip, a sweep of a plurality of transmit antennas associated with the charging device the executed sweep comprising determining an available load associated with each of the plurality of transmit antennas;

determining, based on the available load for each transmit antenna, a first transmit antenna from the plurality of transmit antennas to activate; and activating the first transmit antenna.

9. The method of claim 8, further comprising:

causing, via the first transmit antenna, a power transfer to the smart ring via a load transfer from the first transmit antenna to the receive antenna.

10. The method of claim 9, further comprising;

coupling, via the NFC chip, the first transmit antenna and the receive antenna, wherein the power transfer is enabled via the coupling.

11. The method of claim 8, further comprising:

determining, based on the executed sweep, a position of each transmit antenna to the receive antenna, wherein the determination of the first transmit antenna is further based on the determined positions.

12. The method of claim 11, further comprising:

determining, based on the sweep and the determined positions, a second transmit antenna, the second transmit antenna being equidistant to the receive antenna as the first transmit antenna; and determining, based on the second transmit antenna being equidistant to the to the receive antenna as the first transmit antenna, a current draw for the first and second transmit antenna.

13. The method of claim 12, wherein the first transmit antenna is selected based on the current draw for the first transmit antenna being greater than the current draw for the second transmit antenna.

14. The method of claim 8, wherein the sweep is performed according to a predetermined order of the plurality of transmit antennas.

15. The method of claim 8, wherein each of the plurality of transmit antennas are isolated from each other within the charging device.

* * * * *